United States Patent
Katoh et al.

(10) Patent No.: US 8,262,932 B2
(45) Date of Patent: *Sep. 11, 2012

(54) POLYMERIZABLE LIQUID CRYSTAL COMPOUND, POLYMERIZABLE LIQUID CRYSTAL COMPOSITION, POLYMER AND FILM

(75) Inventors: Shunya Katoh, Kanagawa (JP); Mitsuyoshi Ichihashi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 9 days.

This patent is subject to a terminal disclaimer.

(21) Appl. No.: 13/073,619

(22) Filed: Mar. 28, 2011

(65) Prior Publication Data

US 2011/0237768 A1 Sep. 29, 2011

(30) Foreign Application Priority Data

Mar. 29, 2010 (JP) ................................ 2010-074759

(51) Int. Cl.
*C09K 19/52* (2006.01)
*C09K 19/06* (2006.01)
*C07C 69/76* (2006.01)
*C07C 69/00* (2006.01)

(52) U.S. Cl. ................ 252/299.01; 252/299.6; 428/1.1; 560/1; 560/8; 560/55; 560/64; 560/73

(58) Field of Classification Search ............. 252/299.01, 252/299.6; 428/1.1; 560/1, 8, 55, 64, 73
See application file for complete search history.

(56) References Cited

U.S. PATENT DOCUMENTS

| 2010/0119737 A1 | 5/2010 | Okada et al. | |
| 2011/0233464 A1 * | 9/2011 | Katoh et al. | 252/299.6 |

FOREIGN PATENT DOCUMENTS

| JP | 10-147562 A | 6/1998 |
| JP | 2008-291218 A | 12/2008 |
| JP | 2009-167378 A | 7/2009 |
| JP | 2009-22318 A | 10/2009 |
| WO | 2008/102838 A1 | 8/2008 |

* cited by examiner

*Primary Examiner* — Geraldina Visconti

(74) *Attorney, Agent, or Firm* — Birch Stewart Kolasch & Birch, LLP

(57) ABSTRACT

A polymerizable liquid crystal compound represented by formula (I) is disclosed. $R^0$ and $R^1$ represent a hydrogen atom, or a $C_{1-4}$ alkyl group, provided that at least one of $R^0$ and $R^1$ represent a $C_{1-4}$ alkyl group; $A^0$, A1, $B^0$ and $B^1$ represent a single bond, or a divalent linking group having a cyclic structure; $X^0$, $X^1$, $Y^0$ and $Y^1$ represent a single bond, —O—, —S—, —OCO—, —COO—, —OCOO—, —$NR^2$CO—, —$CONR^2$—, —$OCONR^2$—, —$NR^2$COO—, —$NR^2CONR^2$—, —C=N— or —N=C—; $Q^0$ and $Q^1$ a single bond or a divalent aliphatic group; $Z^0$ and $Z^1$ represent a hydrogen atom, cyano, halogen atom or polymerizable group; and n and m each independently represent an integer of from 0 to 2.

(I)

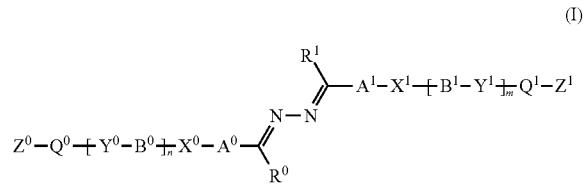

18 Claims, 1 Drawing Sheet

POLYMERIZABLE LIQUID CRYSTAL COMPOUND, POLYMERIZABLE LIQUID CRYSTAL COMPOSITION, POLYMER AND FILM

CROSS-REFERENCE TO RELATED APPLICATIONS

The present application claims the benefit of priority from Japanese Patent Application No. 2010-074759, filed on Mar. 29, 2010, the contents of which are herein incorporated by reference in their entirety.

BACKGROUND OF THE INVENTION

1. Field of the Invention

The present invention relates to a polymerizable liquid crystal compound, polymerizable liquid crystal composition and polymer useful in various applications such as optical members of which examples include optically anisotropic films and heat-shielding films, and also relates to films employing these.

2. Background Art

Previously, polymerizable liquid crystal compounds have been used as a material of optical films. For example, there has been provided optical compensation films for liquid crystal displaying devices employing the alignment of liquid crystal compound and reflective films employing cholesteric liquid crystal. Azine-derivatives have been provided as a polymerizable liquid crystal compound (JP-A-2008-291218, JP-A-2009-167378, WO2008/102838, JP-A-2009-223189, JP-A-10-147562). Especially, in JP-A-2008-291218 or JP-A-2009-167378, azine-derivatives, exhibiting high birefringence, are disclosed.

SUMMARY OF THE INVENTION

However, recently, the demands for liquid crystal materials, exhibiting higher $\Delta n$, more and more increase. And the optical films or the like may be often subjected to irradiation of light, and may be required to have high light resistance. And they may be required to show good compatibility with another liquid crystal material when they are used in various applications.

One object of the invention is to provide a novel polymerizable liquid crystal compound showing high $\Delta n$, high light-resistance, and good compatibility with another liquid crystal material.

Another object of the invention is to provide a polymerizable liquid crystal composition and polymer, employing the polymerizable liquid crystal compound, useful in various applications Another object of the invention is to provide a film, employing the polymerizable liquid crystal compound, useful in various applications The means for achieving the objects are as follows.

[1] A polymerizable liquid crystal compound represented by formula (I):

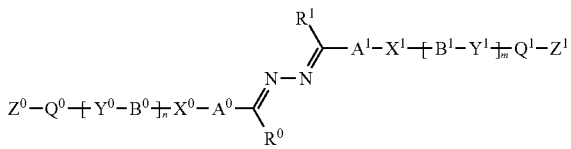

where $R^0$ and $R^1$ each independently represent a hydrogen atom, or a $C_{1-4}$ alkyl group which may have at least one substituent, provided that at least one of $R^0$ and $R^1$ represent a $C_{1-4}$ alkyl group which may have at least one substituent; $A^0$, A1, $B^0$ and $B^1$ each independently represent a single bond, or a divalent linking group having a cyclic structure which may have at least one substituent; $X^0$, $X^1$, $Y^0$ and $Y^1$ each independently represent a single bond, —O—, —S—, —OCO—, —COO—, —OCOO—, —NR$^2$CO—, —CONR$^2$—, —OCONR$^2$—, —NR$^2$COO—, —NR$^2$CONR$^2$—, —C=N— or —N=C— where $R^2$ represents a hydrogen atom or $C_{1-3}$ alkyl group which may have at least one substituent; $Q^0$ and $Q^1$ each independently represent a single bond or a $C_{1-20}$ divalent aliphatic group which may have at least one substituent, provided that one —CH$_2$— or two or more —CH$_2$—, which may be not adjacent to each other, may be replaced with —O—, —S—, —NR$^3$—, —OCO—, —COO—, —OCOO—, —NR$^3$CO—, or —CONR$^3$—; $R^3$ represents a hydrogen atom or $C_{1-3}$ alkyl group; $Z^0$ and $Z^1$ each independently represent a hydrogen atom, cyano, halogen atom or polymerizable group; and n and m each independently represent an integer of from 0 to 2.

[2] The polymerizable liquid crystal compound of [1], wherein $A^0$ and $A^1$ each independently represent a divalent aromatic group which may have at least one substituent.

[3] The polymerizable liquid crystal compound of [1] or [2], wherein $B^0$ and $B^1$ each independently represent a divalent aromatic group which may have at least one substituent.

[4] The polymerizable liquid crystal compound of any one of [1]-[3], wherein $R^0$ and $R^1$ each independently represent a $C_{1-4}$ alkyl group.

[5] The polymerizable liquid crystal compound of any one of [1]-[4], wherein n and m are 1.

[6] The polymerizable liquid crystal compound of any one of [1]-[5], wherein at least one of $Z^0$ and $Z^1$ represents a polymerizable group selected from Group (II) shown below:

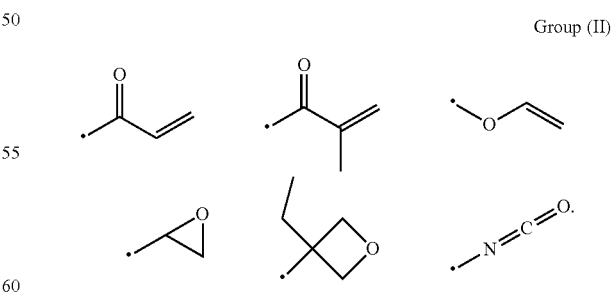

Group (II)

[7] The polymerizable liquid crystal compound of [6], wherein $Z^0$ and $Z^1$ each independently represent a polymerizable group selected from Group (II).

[8] The polymerizable liquid crystal compound of any one of [1]-[7], wherein $Z^0$ and $Z^1$ each independently represent a (meth)acrylate group.

[9] The polymerizable liquid crystal compound of any one of [1]-[8], wherein $Y^0$ and $Y^1$ represent —O—.

[10] A polymerizable liquid crystal composition comprising at least one polymerizable liquid crystal compound of any one of [1]-[9].

[11] The polymerizable liquid crystal composition of [10], comprising at least one chiral compound.

[12] A polymer prepared by polymerizing a polymerizable liquid crystal compound of any one of [1]-[9], or prepared by polymerizing a polymerizable liquid crystal composition of [10] or [11].

[13] A film formed by curing a polymerizable liquid crystal composition of [10] or [11].

[14] A film formed by curing a cholesteric liquid crystal phase of a polymerizable liquid crystal composition of [11].

[15] The film of [13] or [14], having optical anisotropy.

[16] The film of any one of [13]-[15], having selective reflection.

[17] The film of [16], having selective reflection in the infrared region.

According to the invention, it is possible to provide a novel polymerizable liquid crystal compound showing high Δn, high light-resistance, and good compatibility with another liquid crystal material.

According to the invention, it is to provide a polymerizable liquid crystal composition and polymer, employing the polymerizable liquid crystal compound, useful in various applications According to the invention, it is possible to provide a film, employing the polymerizable liquid crystal compound, useful in various applications

DETAILED DESCRIPTION OF THE INVENTION

Figure 1:
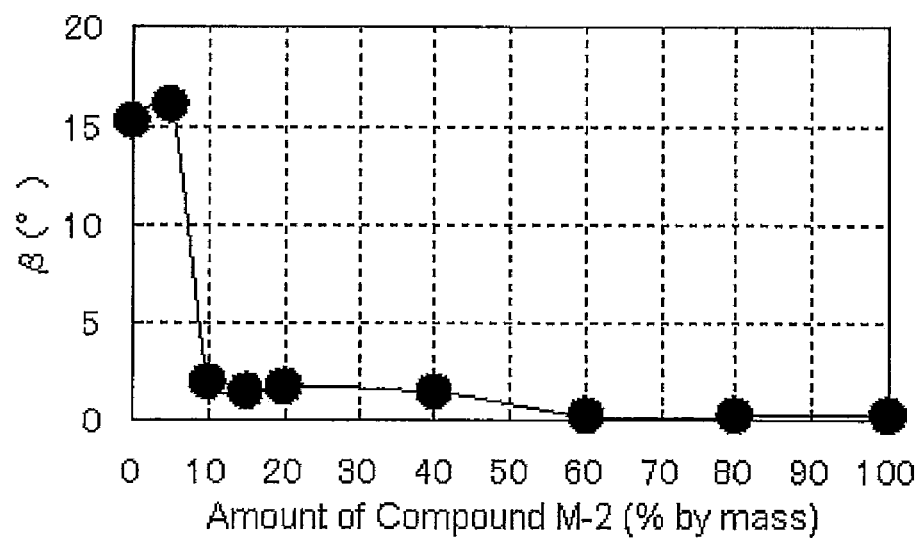
FIG. 1 is a graph showing a relationship between the concentration of Compound G-2 and the tilt angle (β) of liquid crystal molecules in the retardation film prepared in Example.

The present invention will be detailed below. In this description, the numerical range expressed by the wording "a number to another number" means the range that falls between the former number indicating the lowermost limit of the range and the latter number indicating the uppermost limit thereof.

1. Polymerizable Liquid Crystal Compound

The present invention relates to a polymerizable liquid crystal compound represented by formula (I). The compound of the invention shows higher Δn and higher light resistance, compared with the known azine-derivative. The compound of the invention shows also good compatibility with another liquid crystal material, is polymerizable, and is useful in various applications such as optical members.

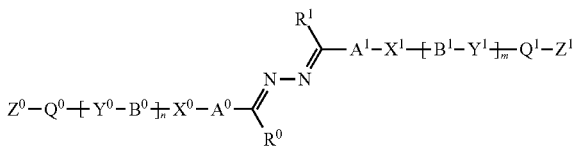

In the formula, $R^0$ and $R^1$ each independently represent a hydrogen atom, or a $C_{1-4}$ alkyl group which may have at least one substituent, provided that at least one of $R^0$ and $R^1$ represent a $C_{1-4}$ alkyl group which may have at least one substituent.

Examples of the alkyl group include methyl, ethyl, n- and iso-propyl, and n-, iso- and tert-butyl. The alkyl group may have at least one substituent, and examples of the substituent include halogen atoms such as fluorine, chlorine and bromine atoms, and $C_{1-5}$ alkyloxycarbonyl group.

At least one of $R^0$ and $R^1$ represent a $C_{1-4}$ alkyl group which may have at least one substituent, or preferably, a non-substituted $C_{1-4}$ alkyl group. Or more preferably, both of them represent a $C_{1-4}$ alkyl group which may have at least one substituent, or even more preferably, represent a non-substituted alkyl group.

In the formula, $A^0$, A1, $B^0$ and $B^1$ each independently represent a single bond, or a divalent linking group having a cyclic structure which may have at least one substituent. The divalent linking group preferably has a 5- to 12-membered cyclic structure. The cyclic structure may be a monocyclic structure or condensed ring structure. The monocyclic structure is preferably a 5- to 7-membered cyclic structure, or more preferably, a 5- or 6-membered cyclic structure. The cyclic structure may be an aromatic or aliphatic cyclic structure. Or the cyclic structure may be a hetero cyclic structure in which at least one hetero atom selected from nitrogen, oxygen and sulfur atoms is embedded. Examples of the cyclic structure include benzene, naphthalene, cyclohexane, pyridine, thiophene, furan, pyrrole, pyrazine, pyrimidine and pyridazine rings. $A^0$ and $A^1$ may have two or more cyclic structures, and in such a case, the cyclic structures may be linked by a single bond or a divalent group. Examples of the divalent group include ethenyl, ethynyl and azo.

Examples of $A^0$, A1, $B^0$ or $B^1$ include but are not limited to, those shown below.

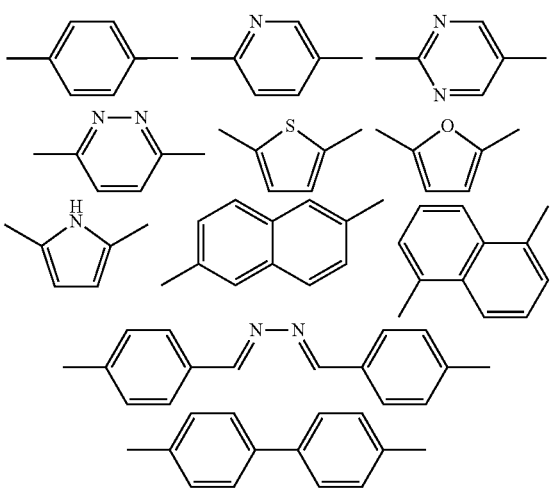

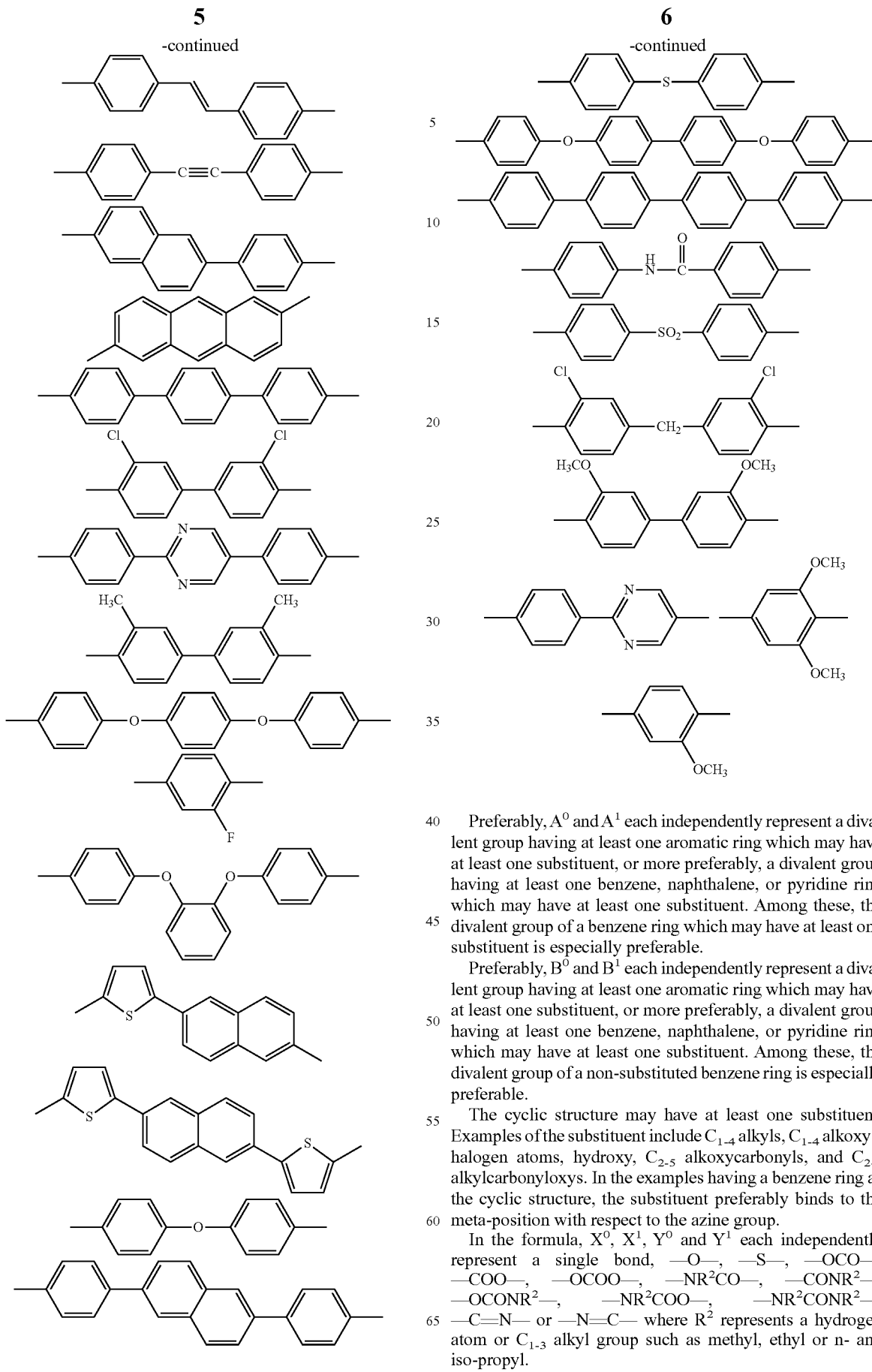

-continued

Preferably, $A^0$ and $A^1$ each independently represent a divalent group having at least one aromatic ring which may have at least one substituent, or more preferably, a divalent group having at least one benzene, naphthalene, or pyridine ring which may have at least one substituent. Among these, the divalent group of a benzene ring which may have at least one substituent is especially preferable.

Preferably, $B^0$ and $B^1$ each independently represent a divalent group having at least one aromatic ring which may have at least one substituent, or more preferably, a divalent group having at least one benzene, naphthalene, or pyridine ring which may have at least one substituent. Among these, the divalent group of a non-substituted benzene ring is especially preferable.

The cyclic structure may have at least one substituent. Examples of the substituent include $C_{1-4}$ alkyls, $C_{1-4}$ alkoxys, halogen atoms, hydroxy, $C_{2-5}$ alkoxycarbonyls, and $C_{2-5}$ alkylcarbonyloxys. In the examples having a benzene ring as the cyclic structure, the substituent preferably binds to the meta-position with respect to the azine group.

In the formula, $X^0$, $X^1$, $Y^0$ and $Y^1$ each independently represent a single bond, —O—, —S—, —OCO—, —COO—, —OCOO—, —NR$^2$CO—, —CONR$^2$—, —OCONR$^2$—, —NR$^2$COO—, —NR$^2$CONR$^2$—, —C=N— or —N=C— where $R^2$ represents a hydrogen atom or $C_{1-3}$ alkyl group such as methyl, ethyl or n- and iso-propyl.

The compounds of the invention, having any selected from the above-described divalent group as $X^0$ or $X^1$, may have high Δn. Preferably, $X^0$ and $X^1$ each independently represent —OCO—, —COO—, —OCOO—, —C=N— or —N=C—.

The compounds of the invention, having any selected from the above-described divalent group as $Y^0$ or $Y^1$, may have high Δn. Preferably, both of $Y^0$ and $Y^1$ are —O—.

In the formula, $Q^0$ and $Q^1$ each independently represent a $C_{1-20}$ divalent aliphatic group which may have at least one substituent; provided that one —$CH_2$— or two or more —$CH_2$—, which may be not adjacent to each other, may be replaced with —O—, —S—, —$NR^3$—, —OCO—, —COO—, —OCOO—, —$NR^3CO$—, or —$CONR^3$—; $R^3$ represents a hydrogen atom or $C_{1-3}$ alkyl group such as methyl, ethyl or n- and iso-propyl. The $C_{1-20}$ divalent aliphatic group is preferably a $C_{1-20}$ (more preferably $C_{2-10}$, or even more preferably $C_{2-6}$) alkylene group, or $C_{2-20}$ (more preferably $C_{2-20}$, or even more preferably $C_{2-6}$) alkenylene group.

Examples of —$Y^0$-$Q^0$- or —$Y^1$-$Q^1$ include —COO—$(CH_2)_q$—O—, —OCO—$(CH_2)_q$—O—, —NHCO—$(CH_2)_q$—O—, —CONH—$(CH_2)_q$—O—, —O—$(CH_2)_q$—O—, —COO—$(CH_{2r+1}O)_q$—O—, —OCO—$(CH_{2r+1}O)_q$—O—, —NHCO—$(CH_{2r+1}O)_q$—O—, —CONH—$(CH_{2r+1}O)_q$—O—, and —O—$(CH_{2r+1}O)_q$—O—. In the formulas, q is an integer of from 1 to 10, and r is an integer of from 1 to 4.

In the formula, n and m each independently represent an integer of from 0 to 2, or preferably 1.

In the formula, $Z^0$ and $Z^1$ each independently represent a hydrogen atom, cyano, halogen atom or polymerizable group. Examples of the polymerizable group include any functional groups capable of carrying out addition polymerization or condensation polymerization. Examples of the polymerizable group include those shown below.

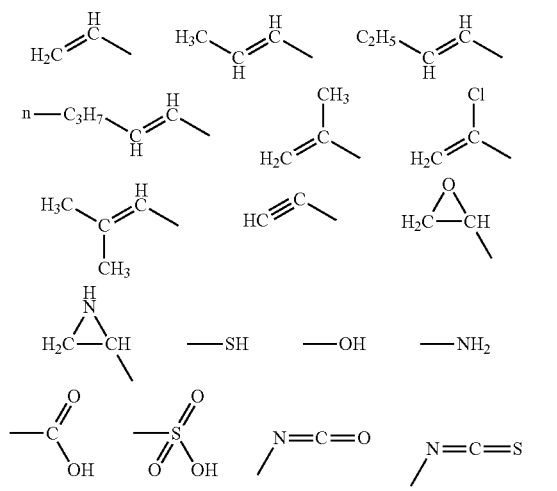

The functional groups capable of carrying out addition polymerization are especially preferable. Among such polymerizable groups, ethylenic unsaturated polymerizable groups and ring-opening polymerizable groups are preferable.

The polymerizable group is preferably selected from Group (II) shown below.

Group (II)

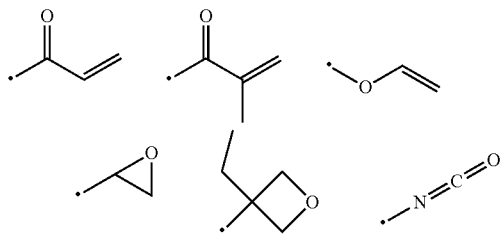

Among these, (meth)acrylate groups are preferable. Or, that is, the groups shown below are preferable.

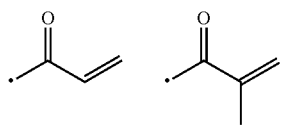

In the formula, preferably, at least on of $Z^0$ and $Z^1$ is a polymerizable group, or more preferably, both of $Z^0$ and $Z^1$ are polymerizable groups. Even more preferably, $Z^0$ and $Z^1$ each independently represent a polymerizable group selected from Group (II) described above. Or even more preferably, $Z^0$ and $Z^1$ represent a (meth)acrylate group.

Examples of —$Y^0$-$Q^0$-$Z^0$ or —$Y^1$-$Q^1$-$Z^1$ include, but are not limited to, those shown below.

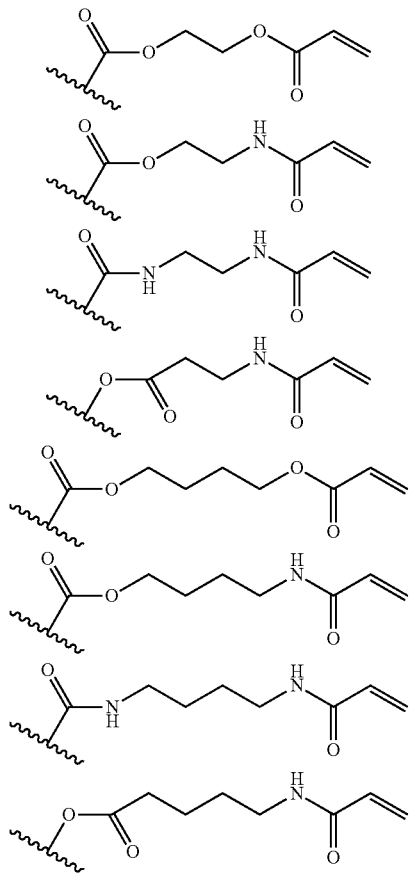

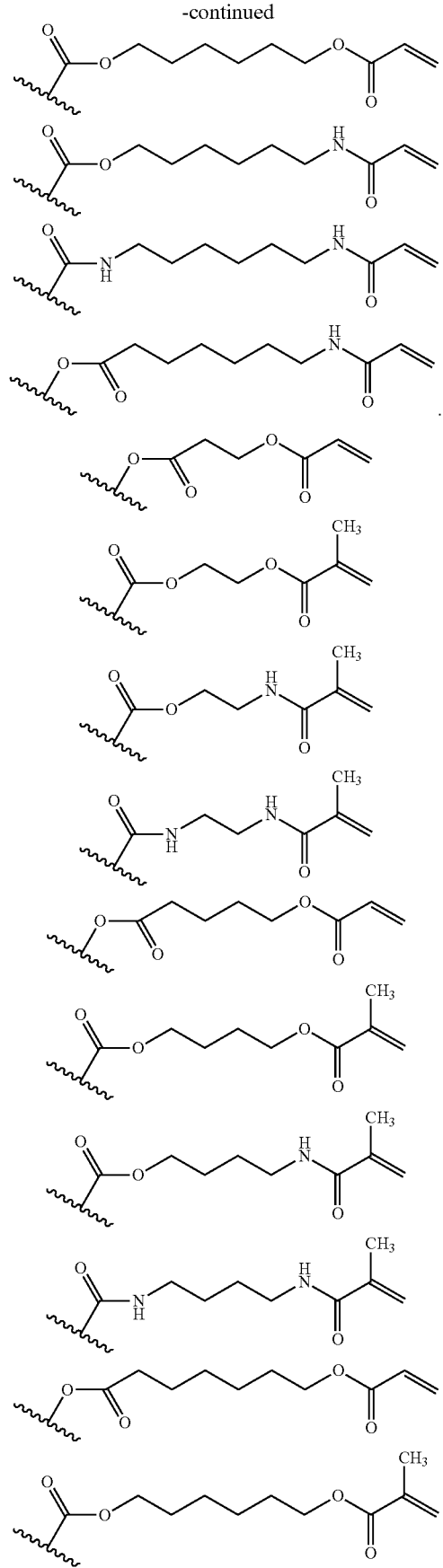
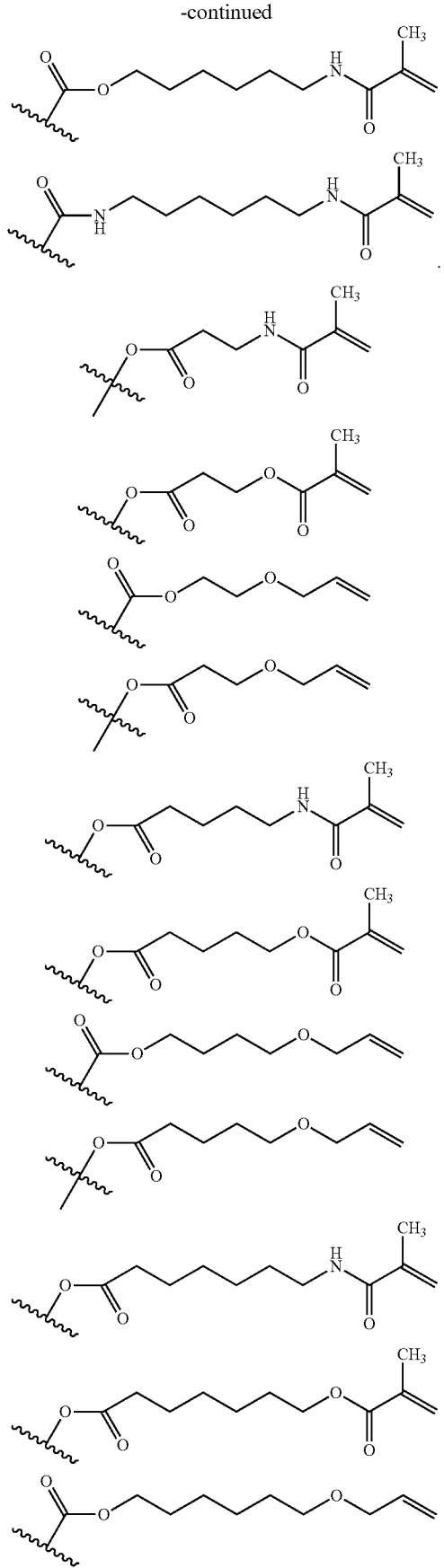

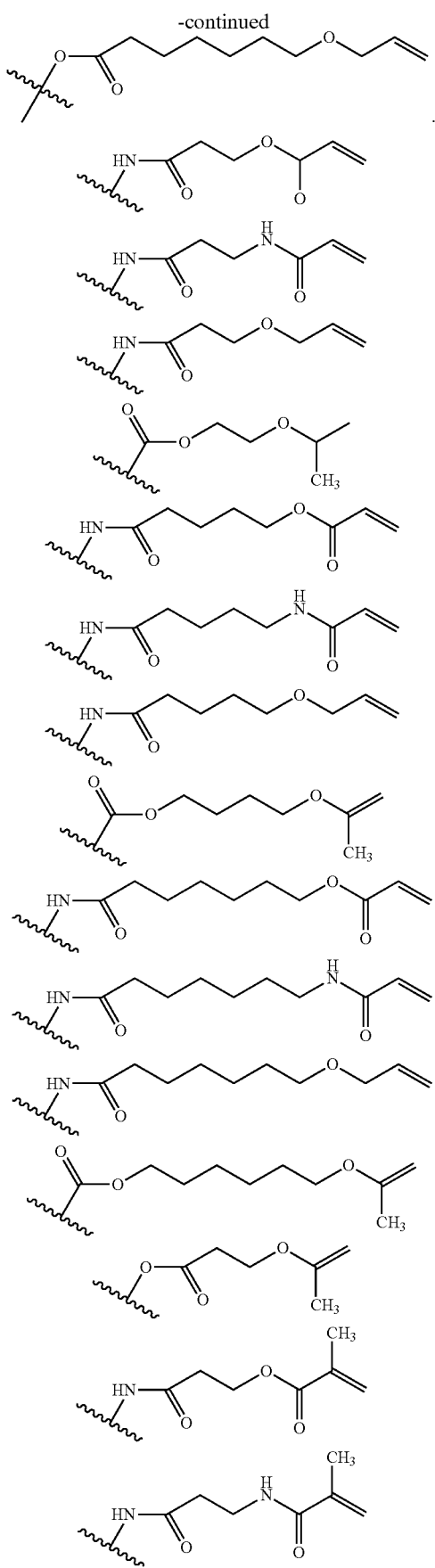
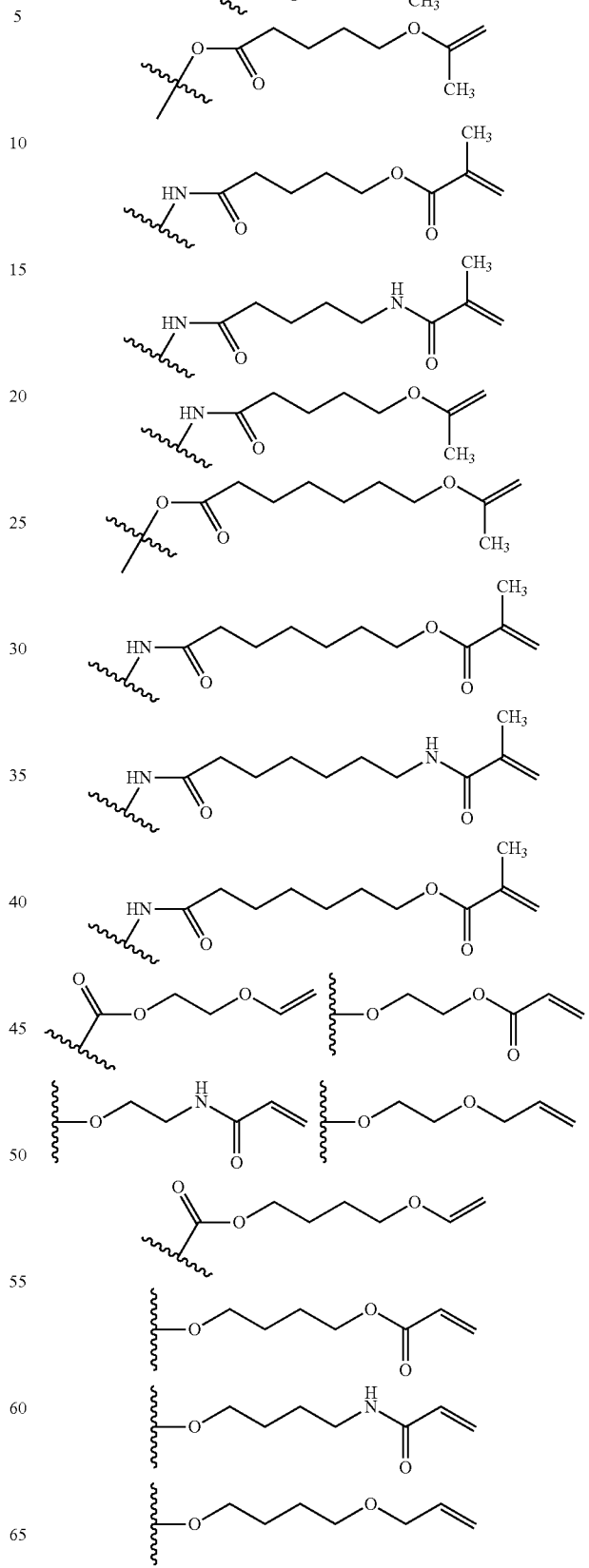

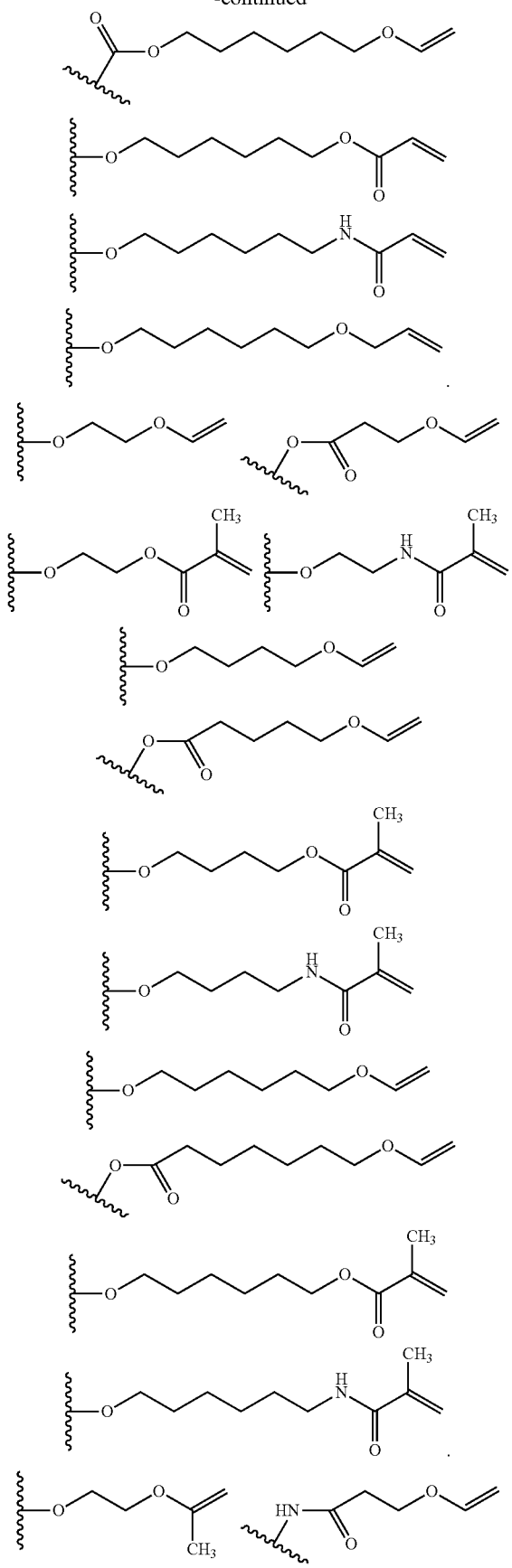
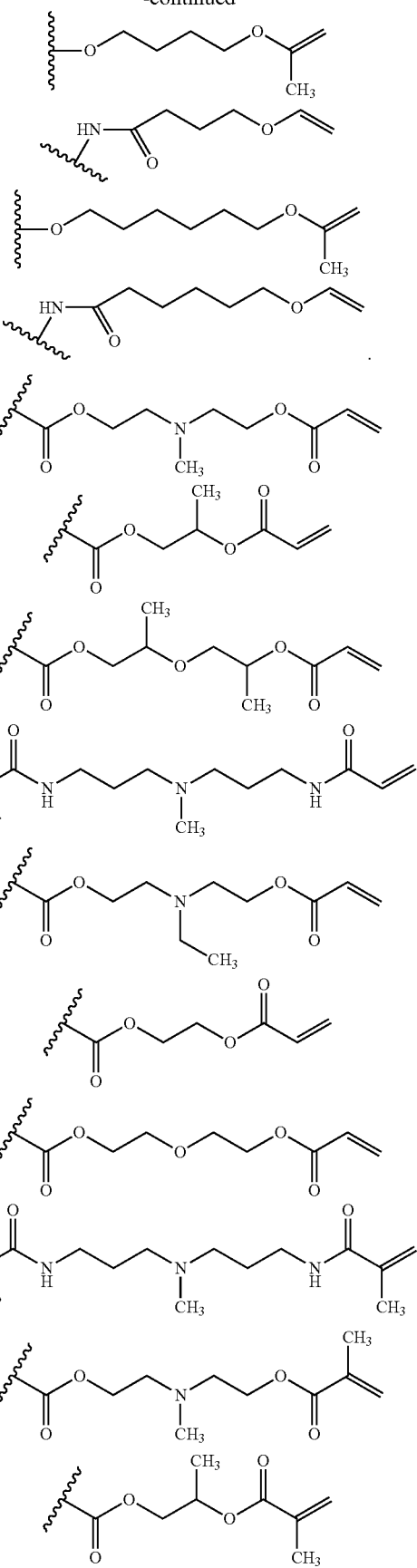

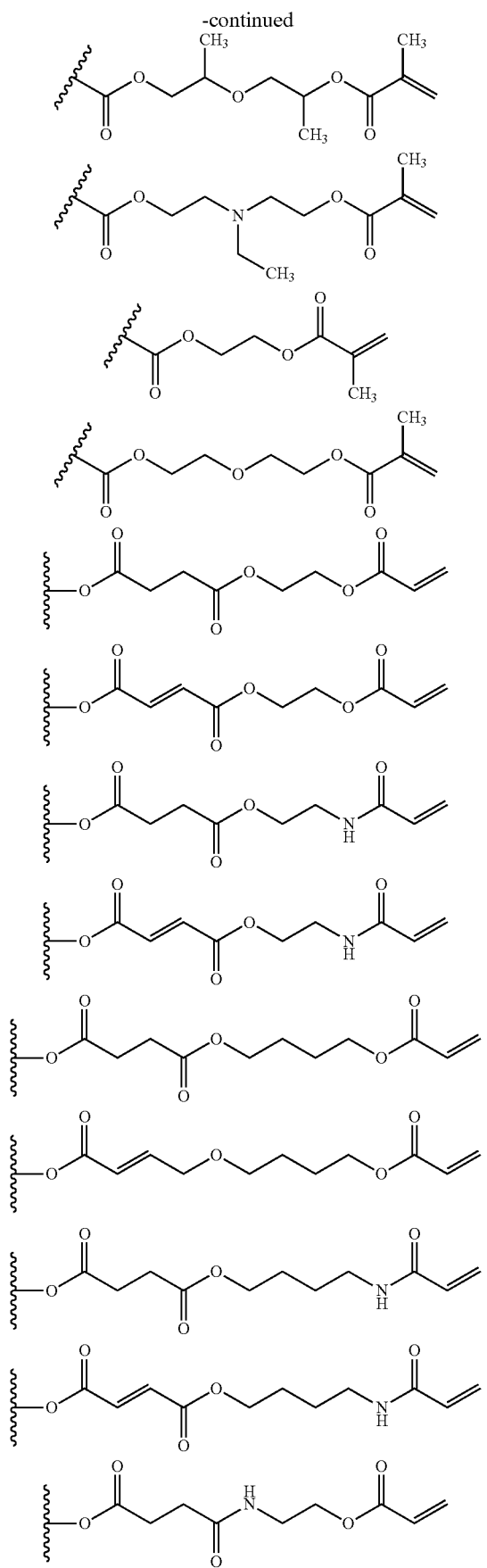
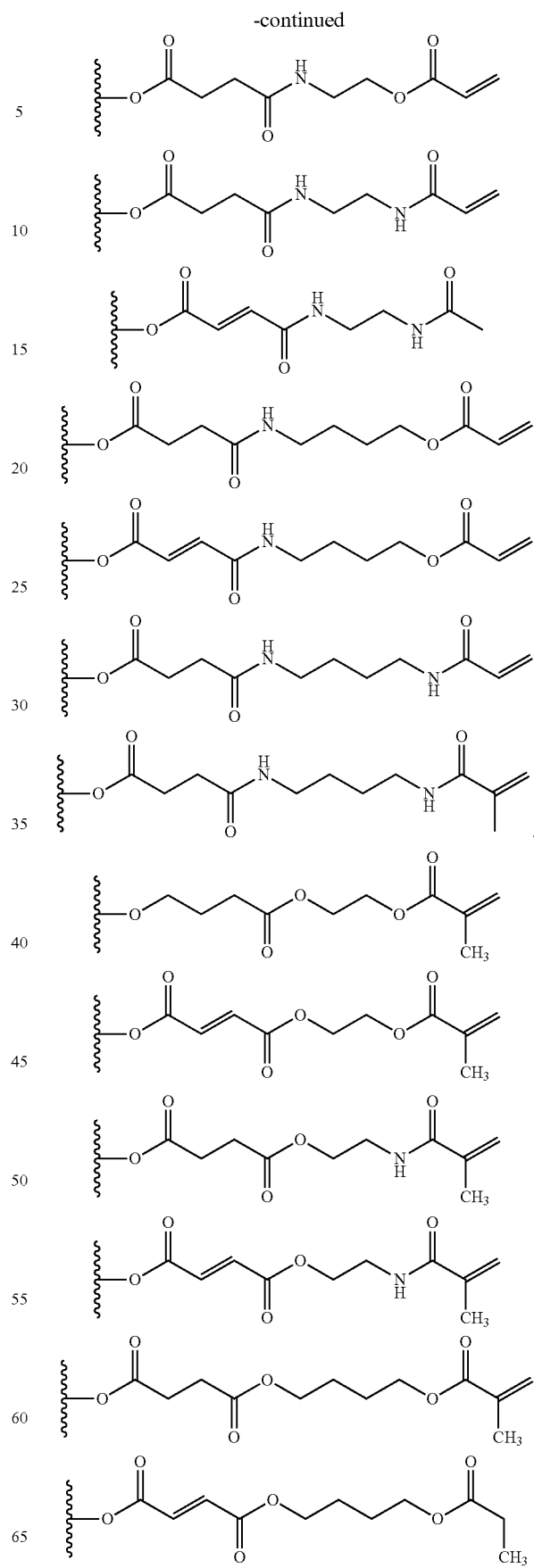

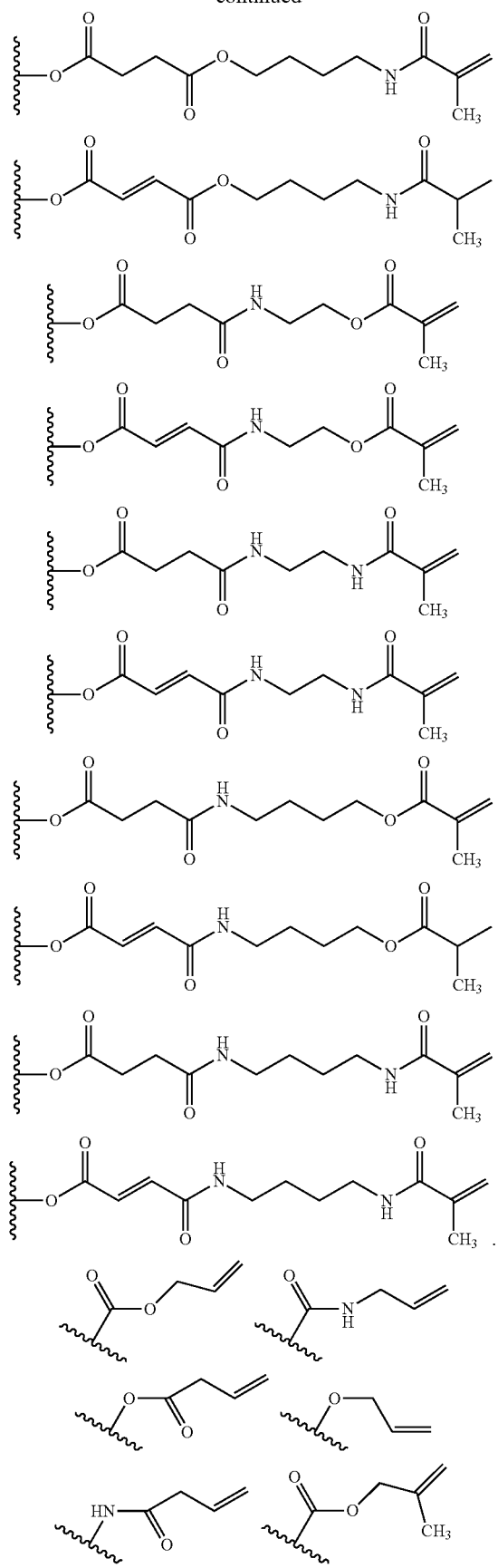
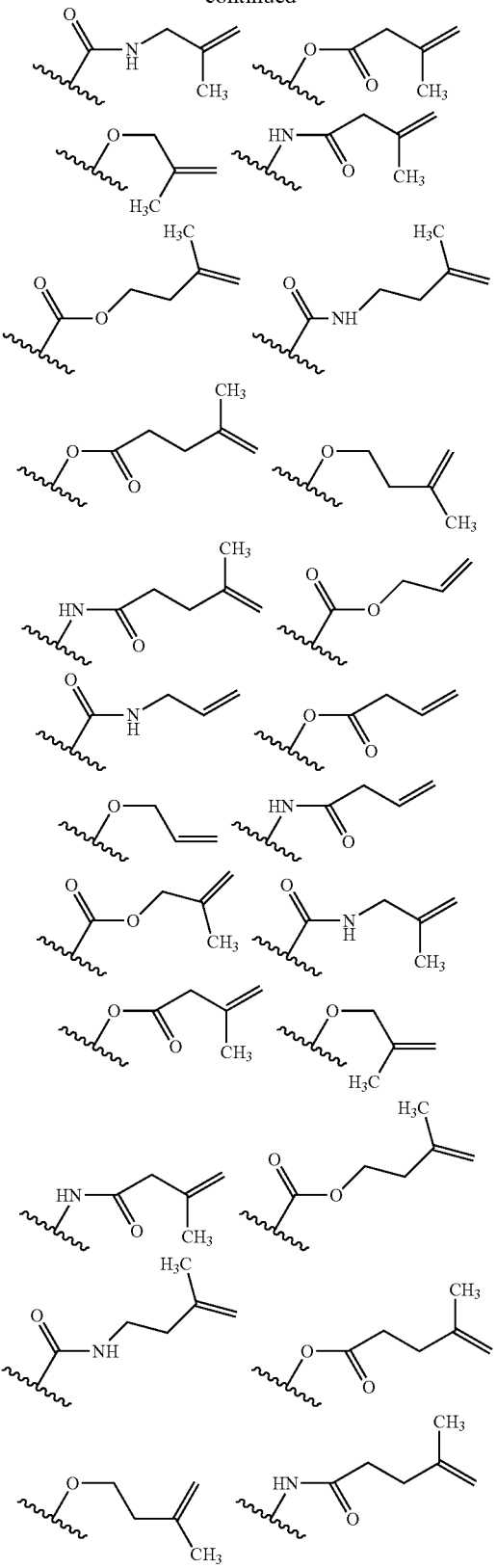
Preferable examples of the compound represented by formula (I) include the compounds represented by formula (Ia) shown below.

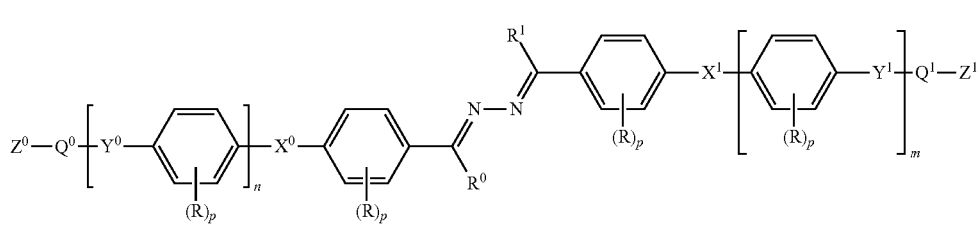

(Ia)

The definitions of the symbols in formula (Ia) are same as those in formula (I) respectively, and their preferable examples are also same as those in formula (I). Each of R represents a substituent, and examples of the substituent represented by R are same as those of the substituent which $A^0$, $A^1$, $B^0$ and $B^1$ in formula (I) may have. In the formula, each of p is an integer of from 0 to 4.

The compound represented by formula (I) may have a symmetric or asymmetric structure with respect to the azine group, =N—N=, as a center. The symmetric compounds may be prepared more easily with a lower cost and tend to show a higher transition temperature to the isotropic phase, compared with the asymmetric compounds.

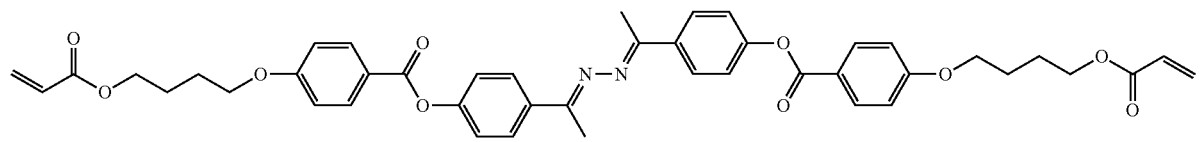

G-1

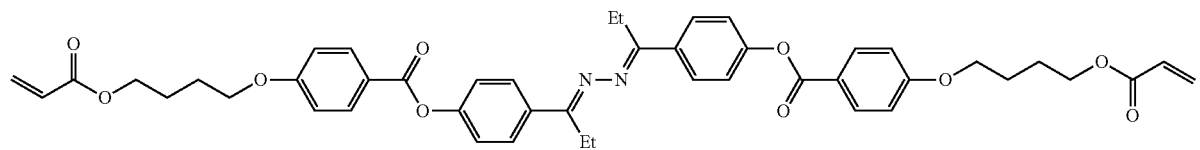

G-2

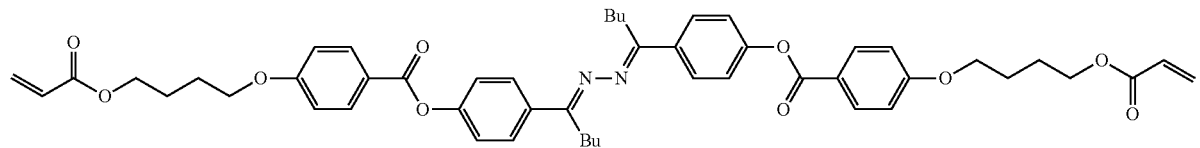

G-3

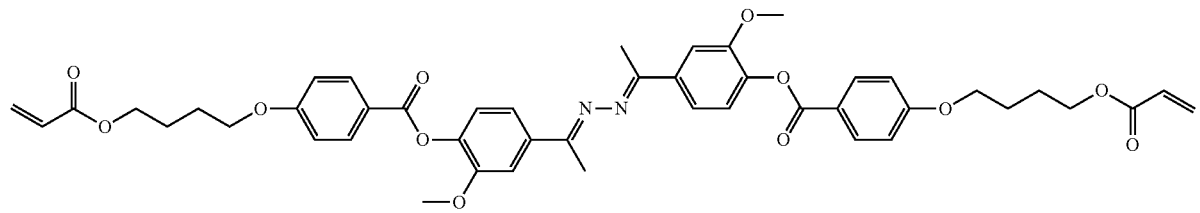

G-4

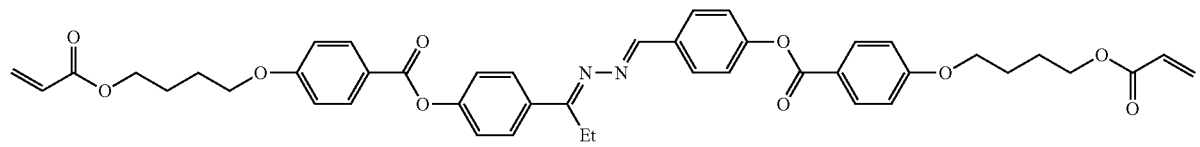

G-5

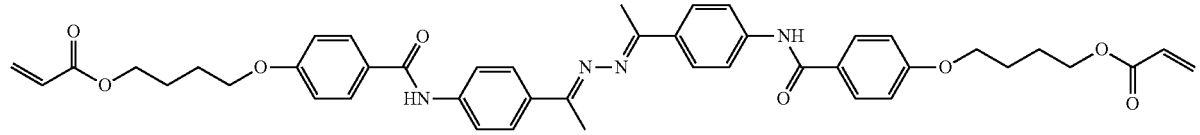

G-6

-continued
G-7
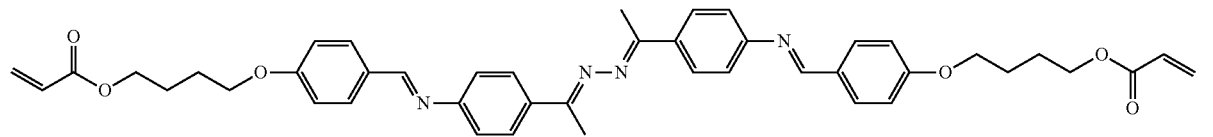
G-8
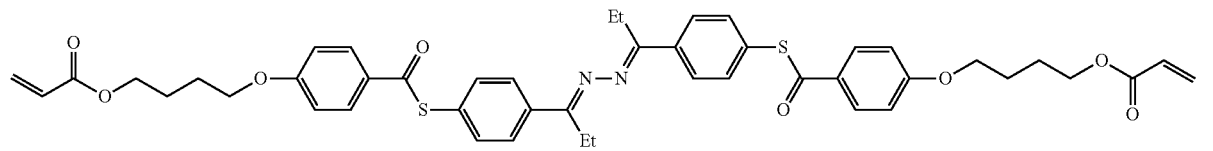
G-9
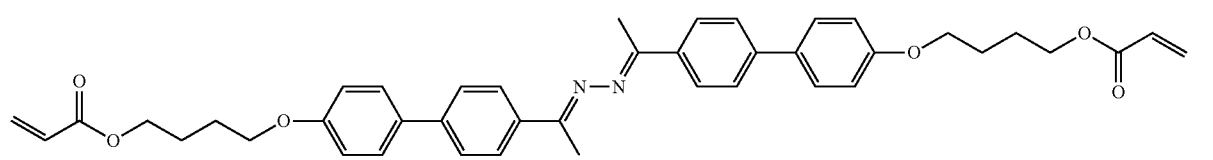
G-10
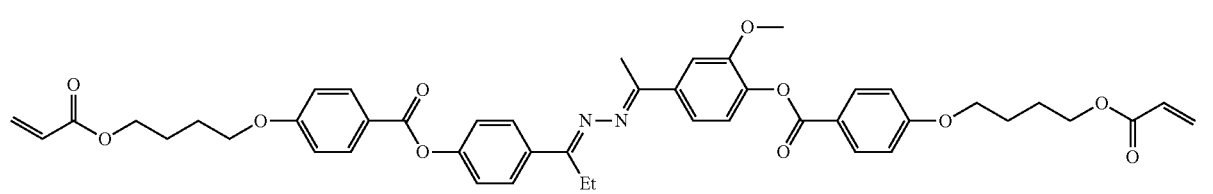
G-11
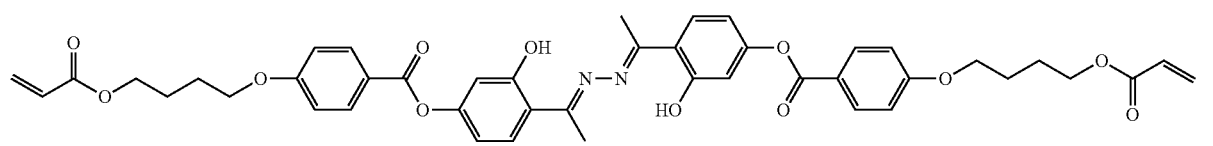
G-12
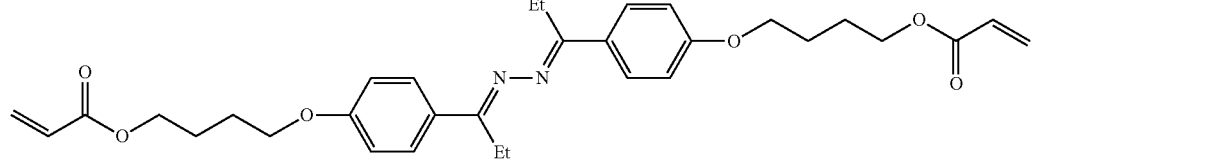
G-13
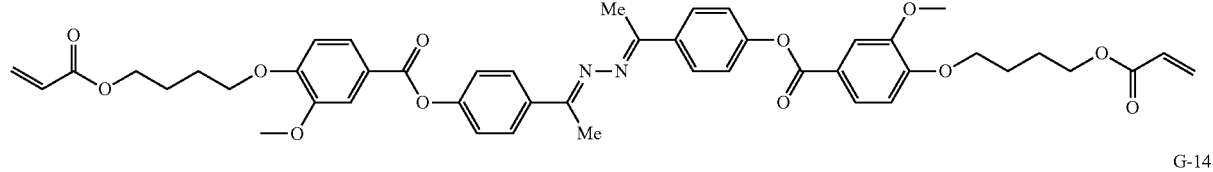
G-14
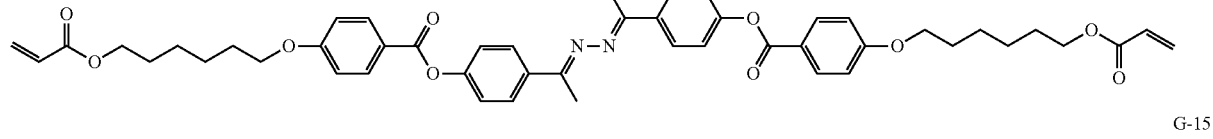
G-15
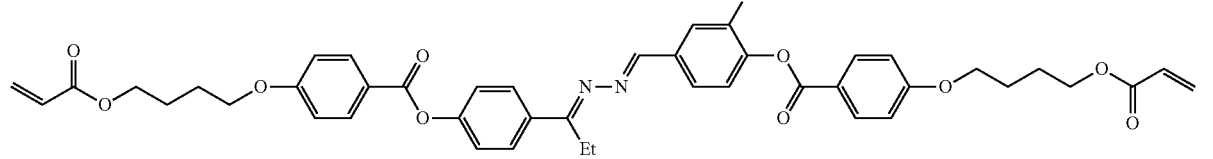

-continued
G-16
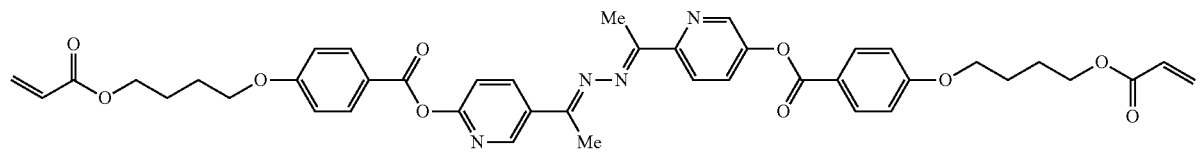
G-17
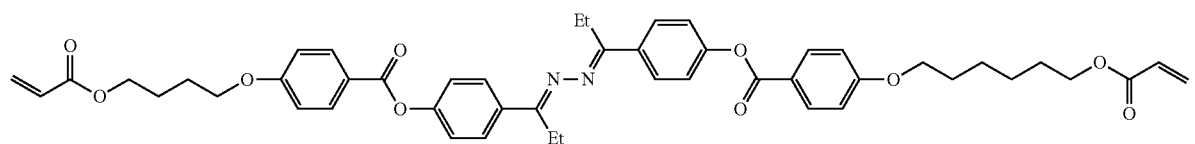
G-18
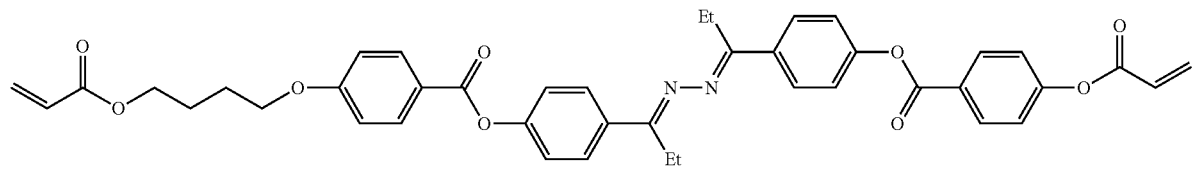
G-19
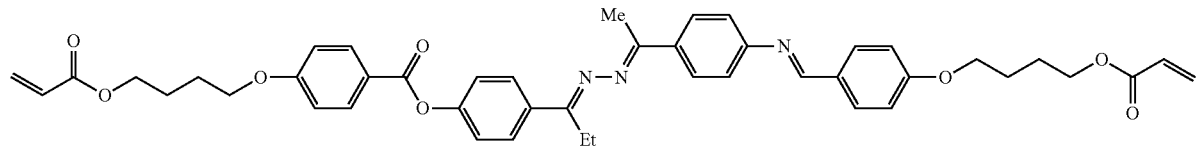
G-20
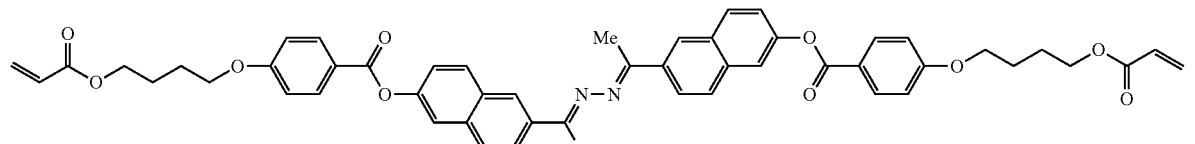
G-21
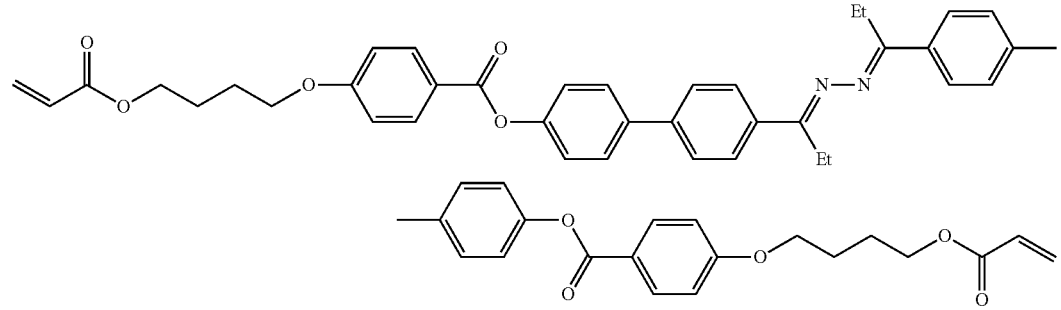
G-22
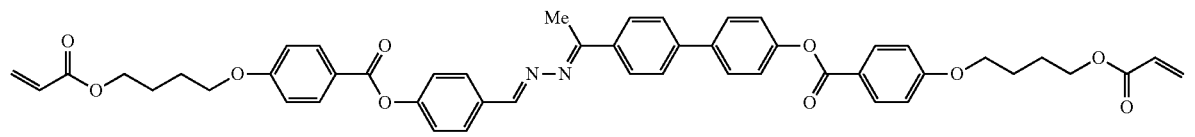
G-23
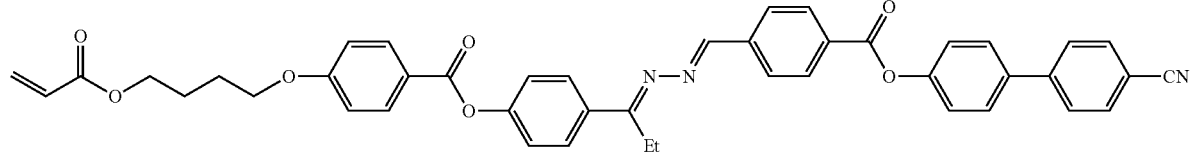

G-24
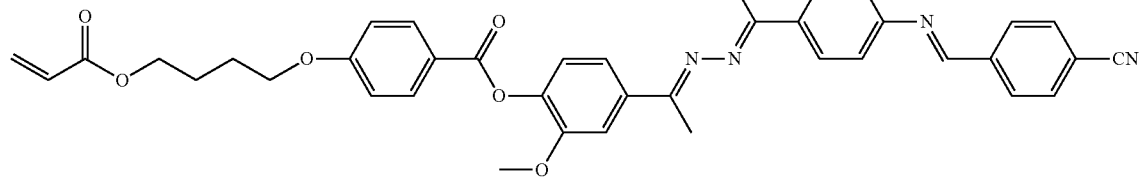

G-25
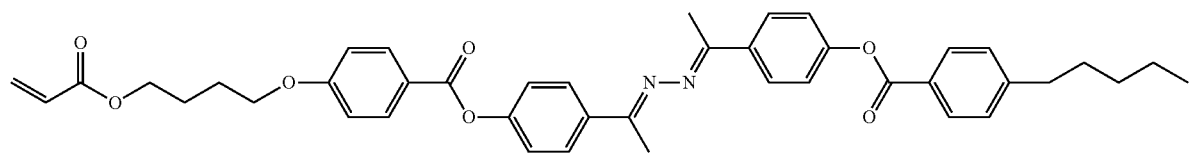

G-26
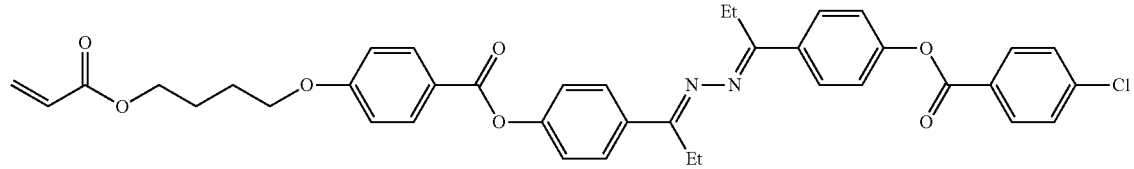

The compound represented by formula (I) may be prepared by combining any organic synthetic reactions. One example is as follows. An intermediate of an azine-derivative represented by formula (III) shown below is prepared, and then, is reacted with arbitrary reagent to give a compound represented by formula (I).

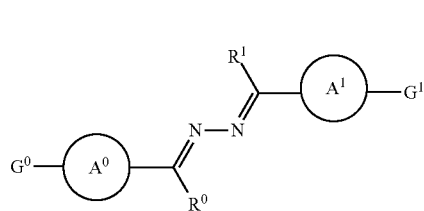
(III)

The definitions of the symbols in formula (III) are same as those in formula (I) respectively; and $G^1$ and $G^0$ respectively represent a reaction group such as amino, hydroxy, mercapto and carboxyl.

The intermediate of the azine-derivative may be synthesized by referring to Journal of the American Chemical Society, 1946, p. 1983.

The symmetric azine-compound may be prepared by mixing hydrazine and two equivalents of aldehyde compound in any solvent at a room temperature. Or the asymmetric azine-compound may be prepared by carrying out the reaction of hydrazine with two equivalents of ketone compound in the presence of any acetic acid catalyst in any solvent under heat.

The asymmetric azine-compound may be synthesized by referring to Journal of the American Chemical Society, 1946, p. 1983.

More specifically, a corresponding hydrazone compound may be prepared by using an excessive amount of hydrazine and a ketone compound, and then be reacted with another ketone compound or aldehyde compound to give the asymmetric azine-compound.

Furthermore, the synthesis of the intermediate, the azine-compound, can be carried out even if the ketone or aldehyde compound has at least one substituent (for example, an alkyl, alkoxy, halogen atom, amino, hydroxy, mercapto, carboxyl, oxycarboxyl, carbonyloxy, amide).

If necessary, the yield of the azine-compound may be improved by inactivating the reaction group (for example, amino, hydroxy, mercapto, carboxyl) with a protective group.

Examples of the reagent to be reacted with the intermediate, the azine-derivative, include the compounds having the group of —$B^0$—$Y^0$-$Q^0$-$Z^0$ (or —$B^1$—$Y^1$-$Q^1$-$Z^1$) and the reaction group which can be reacted with the reaction group in formula (III) to form any chemical bond such as —O—, —S—, —NH—C(=O)—, —C(=O)NH—, —NHC(=O)NH—, —O—C(=O)—, —C(=O)—O—, —CH=N— and —N=CH—. The reagent may be prepared by referring to Japanese Patent No. 4355406, p. 18, [0085]-[0087].

The polymerizable liquid crystal compound of the invention may be prepared by combining the known processes (for example, described in "Synthetic Methods of Organic Compounds in each functional group [I], [II]" written by Sandra, Caro, published by Hirokawa Publishing INC. in 1976) of forming any chemical bonding such as —O—, —S—, —NH—C(=O)—, —C(=O)NH—, —NHC(=O)NH—, —O—C(=O)—, —C(=O)—O—, —CH—N—, and —N=CH—.

The polymerizable liquid crystal compound of the invention may be prepared typically by reacting the azine intermediate with any reagent according to any combination of the reactions of forming any chemical bond such as an ether bond (—O—), ester bond (—C(=O)—O—), amide bond (—C(=O)NH—), imine bond (—CH=N—), mixed acid anhydride (—COOSO$_2$R or —COOCOR) and acid chloride (—COCl). The polymerizable liquid crystal compound may be prepared, if necessary, by further modification.

The formation of an ether bond may be carried out as follows.

(i) A compound represented by formula of $Q^1$-X (X represents a halogen atom), and a compound represented by formula of $Q^2$-OM (M represents an alkali metal, mainly sodium) are mixed, and then are reacted by condensation. In the formulas, $Q^1$ and $Q^2$ each independently represent an organic group B (the same applies to the followings). This reaction is generally called as Williamson synthesis.

(ii) A compound represented by formula of $Q^1$-X (X represents a halogen atom), and a compound represented by formula of $Q^2$-OH are mixed, and then are condensation-reacted in the presence of a base such as sodium hydroxide and potassium hydroxide.

(iii) A compound represented by formula of $Q^1$-E (E represents an epoxy group 9, and a compound represented by formula of $Q^2$-OH are mixed, and then are condensation-reacted in the presence of a base such as sodium hydroxide and potassium hydroxide.

(iv) A compound represented by formula of $Q^1$-OFN ("OFN" represents a group having an unsaturated bond), and a compound represented by formula of $Q^2$-OM (M represents an alkali metal, mainly sodium) are mixed, and then are addition-reacted in the presence of a base such as sodium hydroxide and potassium hydroxide.

(v) A compound represented by formula $Q^1$-X (X represents a halogen atom), a compound represented by formula of $Q^2$-OM (M represents an alkali metal, mainly sodium) are mixed, and are condensation-reacted in the presence of copper or cuprous chloride. This reaction is called as Ullmann condensation.

The formation of an ester or amide bond may be carried out as follows.

(i) A compound represented by formula of $Q^1$-COOH, and a compound represented by formula of $Q^2$-OH or $Q^2$-NH$_2$ are dehydration-condensation-reacted in the presence of an agent of dehydration-condensation (for example, N—N-dicyclohexyl carbodiimide).

(ii) A compound by formula of $Q^1$-COOH is reacted with a halogenating agent to give a compound represented by formula of $Q^1$-COX (X represents a halogen atom); and then the compound represented by formula of $Q^1$-COX is reacted with a compound represented by formula of $Q^2$-OH or $Q^2$-NH$_2$ in the presence of a base.

(iii) A compound represented by formula of $Q^1$-COOH is reacted with acid anhydrite or acid chloride to give a mixed acid anhydride; and then the mixed acid anhydride is reacted with a compound represented by formula of $Q^2$-OH or $Q^2$-NH$_2$.

(iv) A compound represented by formula of $Q^1$-COOH, and a compound represented by formula of $Q^2$-OH or $Q^2$-NH$_2$ are dehydration-condensation-reacted in the presence of acid- or base-catalyst.

The formation of an acid chloride may be carried out as follows.

(i) A compound represented by formula of $Q^1$-COOH is reacted with phosphorus trichloride or phosphorus pentachloride.

(ii) A compound represented by formula of $Q^1$-COOH is reacted with thionyl chloride.

(iii) A compound represented by formula of $Q^1$-COOH is reacted with oxalyl chloride.

(iv) A compound represented by formula of $Q^1$-COOAg (Ag represents a silver) is reacted with chlorine or bromine.

(v) A compound represented by formula of $Q^1$-COOH is reacted with a carbon tetrachloride solution of red mercuric oxide.

The formation of an imine bond may be carried out as follows.

(i) A compound represented by formula of $Q^1$-CHO, and a compound represented by formula of $Q^2$-NH$_2$ are dehydration-condensation-reacted.

In the synthesis of some of the polymerizable liquid crystal compound of the invention, the yield may be improved by protecting hydroxide(s) in the intermediate. Examples of the process for protecting hydroxide(s) include the processes described in "Greene's Protective Groups in Organic Synthesis", third edition, published by Wiley-Interscience, in 1999.

The protection of hydroxide may be carried out as follows.

(i) A compound represented by formula of $Q^1Q^2Q^3$-Si—X (X represents a halogen atom, the same is applied to the followings), and a compound represented by formula of $Q^4$-OH are reacted in the presence of a base such as imidazole or pyridine. In the formula, $Q^1$ to $Q^4$ each independently represent an organic group B (the same is applied to the followings).

(ii) A vinyl ether such as 3,4-dihydro-2H-pyrane, and a compound represented by formula of $Q^2$-OH are reacted in the presence of an acid such as para-toluene sulfonic acid, pyridine para-toluene sulfonate, and hydrochloric acid.

(iii) A compound represented by formula of $Q^1$-C(C=O)—X and a compound represented by formula of $Q^4$-OH are reacted in the presence of a base such as triethylamine and pyridine.

(iv) An acid anhydride represented by formula of $Q^1$-C(C=O)—O—C(C=O)-$Q^2$, and a compound represented by formula of $Q^3$-OH are reacted, if necessary, in the presence of a base such as sodium hydroxide and triethylamine.

(v) A compound represented by formula of $Q^1$-X and a compound represented by formula of $Q^2$-OH are reacted in the presence of a base such as sodium hydroxide and triethylamine.

(vi) A compound represented by formula of $Q^1$-O—CH$_2$—X, and a compound represented by formula of $Q^2$-OH are reacted in the presence of a base such as sodium hydride, sodium hydroxide, triethylamine and pyridine.

(vii) A compound represented by formula of $Q^1$-O—CH$_2$—C(C=O)—X, and a compound represented by formula of $Q^4$-OH are reacted in the presence of a base such as potassium carbonate and sodium hydroxide.

(viii) A compound represented by formula of $Q^1$-O—C(C=O)—X, and a compound represented by formula of $Q^2$-OH are reacted in the presence of a base such as triethylamine and pyridine.

The deprotection of the protection group for hydroxide may be carried out according to any known method as follows.

(i) The deprotection may be carried out by addition of fluorine ion such as tetrabutyl ammonium fluoride.

(ii) The deprotection may be carried out by addition of an acid such as para-toluenesulfonic acid, pyridine para-toluene sulfonate, hydrochloric acid, and acetic acid.

(iii) The deprotection may be carried out by addition of a base such as sodium hydride, sodium hydroxide, potassium hydroxide, sodium carbonate, potassium carbonate, triethylamine and pyridine.

(iv) The deprotection may be carried out in the presence of Pd—C catalyst or the like by addition of hydrogen.

These processes may be selected depending on the structure or type of the protection group.

In any method, at the termination of reaction, any usual post-treatment in the technical field of organic synthetic chemistry may be carried out. The target compound may be isolated, if necessary, by carrying out any known separation or purification treatment such as column chromatography, recrystallization or distillation.

The determination of the target compound may be performed by measurement of NMR spectra, IR spectra or mass spectra, or elemental analysis.

The polymerizable liquid crystal compound of the invention shows high Δn, and the film of the cured alignment of the compound may achieve the desired optical properties with a thinner thickness, compared with the film of the cured alignment of a liquid crystal compound having low Δn. Furthermore, the polymerizable liquid crystal compound of the invention shows good light-resistance, and is useful as a material of the optical films which may often be irradiated with light. The polymerizable liquid crystal compound of the invention shows high Δn, and the film of the cured alignment of the compound may achieve the desired optical properties with a thinner thickness, compared with the film of the cured alignment of a liquid crystal compound having low Δn. Furthermore, the polymerizable liquid crystal compound of the invention shows good light-resistance, and is useful as a material of the optical films which may often be irradiated with light. The azine derivative of the invention, having a partial structure of —$R^0C$=N—N=$CR^1$— (at least one of $R^0$ and $R^1$ represents a predetermined alkyl group), exhibits higher light-resistance, compared with the known azine compound having a partial structure of —HC=N—N=CH—. This may be unexpected. The inventors consider that the reason of obtaining this unexpected effect resides in the properties of the material. Usually, ketone shows lower electrophilic reactivity compared with aldehyde. In fact, in the reaction with hydrazine, when an aldehyde is used as a material, the reaction is carried out even at a room temperature; on the other hand, when a ketone is used as a material, the reaction is not carried out unless being heated. Although the details of the mechanism of deterioration by light are not revealed, the inventors consider that, similarly, the azine skeleton derived from ketone may show lower reactivity and exist more stably, compared with the azine skeleton derived from aldehyde.

2. Polymerizable Liquid Crystal Composition and Film

The present invention relates to a polymerizable liquid crystal composition containing at least one compound represented by formula (I), and to a film formed of the composition. The composition of the invention is useful as a material for optical films such as retardation films and reflective films.

One embodiment of the polymerizable liquid crystal composition of the invention contains at least one compound represented by formula (I) and at least one chiral compound. The film, which is formed by curing the cholesteric liquid crystal alignment of the embodiment, may exhibit selective reflection ascribed to the helical pitch, which is useful as a reflective film (for example, IR reflective film). By using the polymerizable liquid crystal compound showing high Δn, the film having a thickness may exhibit reflection for the broader wavelength region, compared with a film having the same thickness prepared by using a liquid crystal compound showing low Δn.

In the composition of the invention, the compound represented by formula (I) may be a major ingredient or additive. An amount of the compound represented by formula (I) is preferably equal to or more than 5 mass % with respect to the total mass of the composition in terms of obtaining the effect of the compound, more preferably is equal to or more than 10 mass %, even more preferably is equal to or more than 15 mass %, or even much more preferably is equal to or more than 20 mass %. However, an amount of the compound of the invention in the composition is not limited.

(1) Chiral Compound

For preparing the liquid crystal composition of the invention capable of forming a cholesteric liquid crystal phase, preferably, at least one chiral compound may be added to the composition. The chiral compound may be selected from liquid crystal compounds or non-liquid crystal compounds. The chiral compound may be selected from any known chiral agents such as those used in twisted-nematic (TN) and super-twisted-nematic (STN) modes, which are described, for example, in "Ekisho Debaisu Handobukku (Liquid Crystal Device Handbook)", Third Chapter, 4-3 Chapter, p. 199, edited by No. 142 Committee of Japan Society for the Promotion of Science, published by the Nikkan Kogyo Shimbun, Ltd., in 1989. Although, generally, a chiral compound has a chiral carbon in its molecule, axially chiral compounds and planar chiral compound, having no chiral carbon, may be used as a chiral compound in the invention. Examples of the axially chiral compound or the planar chiral compound include binaphthyl, helicene, paracyclophane and derivatives thereof. The chiral compound (chiral agent) may have at least one polymerizable group. Using a polymerizable chiral compound along with a polymerizable rod-like compound, it is possible to obtain a polymer having repeating units derived from the optically-active compound and the rod-like liquid crystal compound respectively by carrying out the polymerization thereof. In such an embodiment, the polymerizable group in the chiral compound is preferably same as that in the rod-like liquid crystal compound. Accordingly, the polymerizable group in the optically-active compound is preferably selected from an unsaturated polymerizable group, epoxy group and aziridinyl group; and an unsaturated polymerizable group is preferable; and an ethylene unsaturated polymerizable group is especially preferable.

An amount of the chiral compound is preferably from 1 to 30% by mole with respect to an amount of the liquid crystal compound represented by formula (I) used along with it. A smaller amount of the chiral compound is more preferable since influence thereof on liquid crystallinity may be small. Accordingly, chiral compounds having a strong helical twisting power are preferable since they may achieve the desired helical pitch by being added in a small amount. Examples of such a chiral compound having a strong helical twisting power include those described in JPA 2003-287623.

(2) Other Liquid Crystal Compounds

The composition of the invention may contain at least one liquid crystal compound other than formula (I) along with the compound of formula (I). The compound represented by formula (I) exhibits high compatibility with another liquid crystal compound, may not become opacified even if being mixed with other liquid crystal compound(s), and may form a transparent film. According to the invention, the composition may contain other liquid crystal compound(s) along with the compound represented by formula (I), and may be used in various applications. Examples of other liquid crystal compound which can be used along with the compound represented by formula (I) include azomethines, azoxys, cyanobiphenyls, cyanophenyl esters, benzoic acid esters, cyclohexanecarboxylic acid phenyl esters, cyanophenylcyclohexanes, cyano-substituted phenylpyrimidines, alkoxy-substituted phenylpyrimidines, phenyl dioxanes, tolans and alkenylcyclohexyl benzonitriles. In the invention, the liquid crystal compound can be selected from not only low-molecular weight compounds but also high-molecular weight compounds.

Other liquid crystal compound which can be used along with the compound represented by formula (I) may be polymerizable or not polymerizable. Examples of the rod-like liquid crystal having no polymerizable group are described in many documents such as Y. Goto et. al., Mol. Cryst. Liq. Cryst. 1995, Vol. 260, pp. 23-28.

A polymerizable rod-like liquid crystal compound may be prepared by introducing a polymerizable group in rod-liquid crystal compound. Examples of the polymerizable group include an unsaturated polymerizable group, epoxy group, and aziridinyl group; and an unsaturated polymerizable group is preferable; and an ethylene unsaturated polymerizable group is especially preferable. The polymerizable group may be introduced in a rod-like liquid crystal compound according to any method. The number of the polymerizable group in the polymerizable rod-like liquid crystal compound is preferably from 1 to 6 and more preferably from 1 to 3. Examples of the polymerizable rod-like liquid crystal compound include those described in Makromol. Chem., vol. 190, p. 2255 (1989), Advanced Materials, vol. 5, p. 107 (1993), U.S. Pat. No. 4,683,327, U.S. Pat. No. 5,622,648, U.S. Pat. No. 5,770,107, WO95/22586, WO95/24455, WO97/00600, WO98/23580, WO98/52905, JPA No. 1-272551, JPA No. 6-16616, JPA No. 7-110469, JPA No. 11-80081 and JPA No. 2001-328973. Plural types of polymerizable rod-like liquid crystal compounds may be used in combination. Using plural types of polymerizable rod-like liquid crystal compounds may contribute to lowering the alignment temperature.

An amount of other liquid crystal compound(s) is not limited. Any embodiments, in which an amount of the liquid crystal compound represented by formula (I) is higher or smaller than or same as that of other liquid crystal compound(s), may be prepared depending on their applications.

As confirmed the effect in Examples, it is possible to achieve a uniform horizontal alignment of a liquid crystal compound, which is not capable of aligning in any uniform horizontal alignment state alone, without any agent for controlling the alignment at the air-interface by adding the polymerizable liquid crystal compound represented by formula (I). In order to obtain this effect, an amount of the compound of the invention is preferably equal to or more than 10% by mass with respect to the total mass of all of the liquid crystal compounds to be used. However, As confirmed the effect in Examples, by adjusting the thickness of the film, the similar effect may achieve by adding the compound of the invention in a smaller amount. Therefore, the amount of the compound is not limited to the above-described range.

(3) Polymerization Initiator

The composition of the invention preferably contains at least one polymerization initiator. According to the invention, the polymerization may be carried out under irradiation of ultraviolet light, and the polymerization initiator is preferably selected from photo-polymerization initiators capable of initiating polymerizations by irradiation of ultraviolet light. Examples of the photo-polymerization initiator include α-carbonyl compounds (those described in U.S. Pat. Nos. 2,367,661 and 2,367,670), acyloin ethers (those described in U.S. Pat. No. 2,448,828), α-hydrocarbon-substituted aromatic acyloin compounds (those described in U.S. Pat. No. 2,722,512), polynuclear quinone compounds (those described in U.S. Pat. Nos. 3,046,127 and 2,951,758), combinations of triarylimidazole dimer and p-aminophenyl ketone (those described in U.S. Pat. No. 3,549,367), acrydine and phenazine compounds (those described in Japanese Laid-Open Patent Publication "Tokkai" No. S60-105667 and U.S. Pat. No. 4,239,850), and oxadiazole compounds (those described in U.S. Pat. No. 4,212,970).

An amount of the photo-polymerization initiator is preferably from 0.1 to 20% by mass, more preferably from 1 to 8% by mass, with respect to the liquid crystal composition (the solid content when the composition is a coating liquid).

(4) Alignment Controlling Agent

Any alignment controlling agent, which can contribute to stably or promptly forming a liquid crystal phase such as a cholesteric liquid crystal phase, may be added to the liquid crystal composition of the invention. Examples of the alignment controlling agent include fluorine-containing (meth) acrylate series polymers and compounds represented by formula (X1)-(X3). Two or more types selected from these compounds may be used in combination. These compounds may contribute to aligning liquid crystal molecules with a small tilt angle or horizontally at the air-interface alignment. It is to be understood that the term "horizontal alignment" in the specification means that the direction of long axis of a liquid crystalline molecule is parallel to the layer plane, wherein strict parallelness is not always necessary; and means, in this specification, that a tilt angle of the mean direction of long axes of liquid crystalline molecules with respect to the horizontal plane is smaller than 20°. The layer in which liquid crystal molecules are horizontally aligned at the air-interface may hardly suffer from alignment defects, and may have a high transparency for a visible light and have a high reflection rate. On the other hand, the layer in which liquid crystal molecules are aligned with a large tilt angle may suffer from the finger-print pattern, and may have a low reflective rate, high haze and diffraction characteristics, because of the misalignment between the helical axis of the cholesteric liquid crystal phase and the normal line of the layer surface.

Examples of the fluorine-containing (meth)acrylate series polymer, which can be used as an alignment controlling agent, include those described in JPA 2007-272185, [0018]-[0043].

The compounds represented by formula (X1)-(X3), which can be used as an alignment controlling agent, will be described in detail respectively.

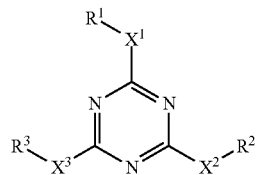

(X1)

In the formula, $R^1$, $R^2$ and $R^3$ each independently represent a hydrogen atom or a substituent group; $X^1$, $X^2$ and $X^3$ each independently represent a single bond or divalent linking group. The substituent group represented by $R^1$-$R^3$ respectively is preferably a substituted or non-substituted alkyl group (more preferably a non-substituted alkyl or a fluorinated alkyl group), an aryl group (more preferably an aryl group having at least one fluorinated alkyl group), a substituted or non-substituted amino group, an alkoxy group, an alkylthio group, or a halogen atom. The divalent linking group represented by $X^1$, $X^2$ and $X^3$ respectively is preferably selected from the group consisting of an alkylene group, an alkenylene group, a divalent aryl group, a divalent heterocyclic group, —CO—, —NR$^a$— (where R$^a$ represents a $C_{1-5}$ alkyl group or a hydrogen atom), —O—, —S—, —SO—, —SO$_2$— and any combinations thereof. The divalent linking group is preferably selected from the group consisting of an alkylene group, a phenylene group, —CO—, —NR$^a$—, —O—, —S—, —SO$_2$— and any combinations thereof. The number of carbon atom(s) in the alkylene group is preferably from 1 to 12. The number of carbon atoms in the alkenylene group is preferably from 2 to 12. The number of carbon atoms in the aryl group is preferably from 6 to 10.

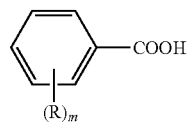

(X2)

In the formula, R represents a substituent group; and m is an integer of from 0 to 5. When m is equal to or more than 2, two or more R are same or different from each other. Preferable examples of the substituent group represented by R are same as those exemplified above as an example of $R^1$, $R^2$ or $R^3$ in formula (X1). In the formula, m is preferably from 1 to 3, and is especially preferably 2 or 3.

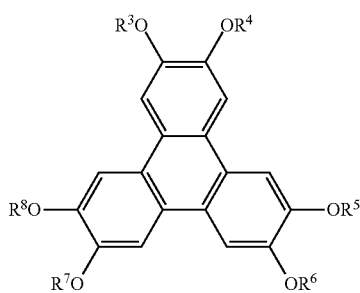

(X3)

In the formula, $R^4$, $R^5$, $R^6$, $R^7$, $R^8$ and $R^9$ each independently represent a hydrogen atom or a substituent group. Preferable examples of $R^4$, $R^5$, $R^6$, $R^7$, $R^8$ or $R^9$ include those exemplified above as an example of $R^1$, $R^2$ or $R^3$ in formula (X1).

Examples of the compound represented by formula (X1), (X2) or (X3), which can be used as an alignment controlling agent, include the compounds described in JPA 2005-99248.

One compound of formula (X1), (X2) or (X3) may be used alone, or two or more compounds of formula (X1), (X2) or (X3) may be used in combination.

An amount of the compound represented by formula (X1), (X2) or (X3) to be added to the liquid crystal composition is preferably from 0.01 to 10% by mass, more preferably from 0.01 to 5% by mass, or especially preferably from 0.02 to 1 by mass, with respect to an amount of the liquid crystal compound.

(5) Process for Preparing Films of Composition

The composition of the invention is useful for preparing optical films such as retardation films and reflective films. One example of the process for preparing the film comprising (i) applying the polymerizable liquid crystal composition of the invention to the surface of a substrate or the like to form a liquid crystal phase (a cholesteric liquid crystal phase); and (ii) irradiating the curable liquid-crystal composition with ultraviolet light for promoting the curing reaction, thereby fixing the liquid crystal phase (the cholesteric liquid crystal phase) and then forming a light-reflective layer.

The steps of (i) and (ii) may be repeated to form a lamination of the plural cured films. The liquid-crystal composition is preferably prepared as a coating liquid of the material dissolved and/or dispersed in a solvent. The coating liquid may be applied to the substrate or the like, according to various methods of a wire bar coating method, an extrusion coating method, a direct gravure coating method, a reverse gravure coating method, a die coating method or the like. As the case may be, an inkjet apparatus may be used in which a liquid-crystal composition may be jetted out through a nozzle to form the intended coating film.

Next, the coating film of the liquid-crystal composition formed on the surface of the substrate or the like is made to have a liquid crystal phase such as a cholesteric liquid crystal phase. In an embodiment where the curable liquid-crystal composition is prepared as a coating liquid that contains a solvent, the coating film may be dried to remove the solvent, thereby the coating film may be made to have the intended liquid-crystal phase. If desired, the coating film may be heated up to the transition temperature to the cholesteric liquid-crystal phase. For example, the coating film is once heated up to the temperature of the isotopic phase, and then cooled to the liquid crystal phase transition temperature, whereby the film may stably have the intended liquid-crystal phase. The liquid-crystal transition temperature of the liquid crystal composition is preferably within a range of from 10 to 250 degrees Celsius from the viewpoint of the production aptitude, more preferably within a range of from 10 to 150 degrees Celsius. When the temperature is lower than 10 degrees Celsius, the coating film may require a cooling step or the like for cooling it to the temperature range within which the film could exhibit a liquid-crystal phase. On the other hand, when the temperature is higher than 250 degrees Celsius, the coating film may require a higher temperature in order that it could be in an isotropic liquid state at a higher temperature than the temperature range within which the film once exhibits a liquid-crystal phase; and this is disadvantageous from the viewpoint of heat energy dissipation, substrate deformation, degradation, etc.

Next, in the step of (ii), the coating film in a liquid crystal state is irradiated with ultraviolet light to promote the curing reaction thereof. For ultraviolet irradiation, used is a light source of an ultraviolet lamp or the like. In this step, the ultraviolet irradiation promotes the curing reaction of the liquid-crystal composition, and the liquid crystal phase is thereby fixed and the intended light-reflective layer is thus formed.

The ultraviolet irradiation energy dose is not specifically defined, but in general, it is preferably from 100 mJ/cm$^2$ to 800 mJ/cm$^2$ or so. Not specifically defined, the time for ultraviolet radiation to the coating film may be determined from the viewpoint of both the sufficient strength of the cured film and the producibility thereof.

For promoting the curing reaction, ultraviolet irradiation may be attained under heat. The temperature in ultraviolet irradiation is preferably kept within a temperature range within which the cholesteric liquid-crystal phase can be kept safely as such with no disturbance. The oxygen concentration in the atmosphere participates in the degree of polymerization of the cured film. Accordingly, in case where the cured film could not have the intended degree of polymerization in air and the film strength is therefore insufficient, preferably, the oxygen concentration in the atmosphere is lowered according to a method of nitrogen purging or the like.

In the above step, the cholesteric liquid-crystal phase is fixed and the intended light-reflective layer is thereby formed. A most typical and preferred embodiment of the "fixed" liquid-crystal state is such that the alignment of the liquid-crystal compound to form the liquid crystal phase is held as such, to which, however, the invention is not limited. Concretely, the fixed state means that, in a temperature range of generally from 0 to 50 degrees Celsius, or from −30 to 70 degrees Celsius under a severer condition, the layer does not have flowability and does not undergo any alignment morphology change in an external field or by an external force applied thereto, and the layer can continue to stably keep the fixed alignment morphology. In the invention, the alignment state of the liquid-crystal phase is fixed through the curing reaction as promoted by ultraviolet irradiation.

In the invention, it is enough that the optical properties of the liquid crystal phase are held in the layer, and finally it is any more unnecessary that the liquid-crystal composition in the cured layer exhibits liquid crystallinity. For example, the liquid-crystal composition may be converted to a high-molecular weight substance and may lose the liquid crystallinity.

The thickness of the cured layer is not limited. The preferable thickness is determined depending on its application or the desired optical properties. Usually, the thickness is preferably from 0.1 to 20 micro meters, or more preferably from 0.5 to 10 micro meters.

As confirmed the effect in Examples, in the embodiment wherein the compound represented by formula (I) has a function of an agent for promoting horizontal alignment, the film having a certain level of the thickness is preferable, or the film having a thickness of 2 or more micrometers is preferable. The range of the thickness is not limited to the above-described range since the film having a thinner thickness may bring about a similar effect by increasing the content of the compound.

(6) Substrate

The film of the invention may have a substrate. The substrate may be selected from those having a self-supporting property or those capable of supporting the cured layer. The materials or optical properties thereof are not limited. In some applications, the substrate may be required to have a high transmission for a visible light. Polymer films having a high transmission for a visible light include those used in display devices such as a liquid crystal display device as an optical film. Preferable examples of the polymer film which can be used as a substrate include poly ester films such as polyethylene terephthalate (PET), polybutylene and polyethylene naphthalate (PEN) films; polycarbonate (PC) films; polymethylmethacrylate films; polyolefin films such as polyethylene and polypropylene films; polyimide films, triacetyl cellulose (TAC) films. Polyethylene terephthalate and triacetyl cellulose are preferable.

(7) Alignment Layer

The film of the invention may have an alignment layer disposed between the cured layer and the substrate. The alignment layer may have a function capable of aligning liquid crystal molecules in the cholesteric liquid crystal layer more precisely. The alignment layer may be prepared by subjecting a film made of an organic compound (preferably a polymer) to a rubbing treatment, obliquely depositing an inorganic compound, forming a layer having microgrooves. Alignment layers having an alignment effect under an electric or magnetic field or irradiation are also known. Among these, alignment layers prepared by subjecting a film of a polymer to a rubbing treatment are preferred.

Examples of the material which can be used for preparing the alignment layer include polymers such as polymethylmethacrylate, acrylic acid/methacrylic acid copolymer, styrene/maleimide copolymer, polyvinyl alcohol, modified polyvinyl alcohol, poly(N-methylolacrylamide), styrene/vinyl toluene copolymer, chloridosulfuric polyethylene, cellulose nitrate, polyvinyl chloride, chlorinated polyolefin, polyester, polyimide, vinyl acetate/vinyl chloride copolymer, ethylene/vinyl acetate copolymer, carboxymethyl cellulose, gelatin, polyethylene, polypropylene and polycarbonate; and silane coupling agents. Preferable examples of the polymer are water-soluble polymers such as poly(N-methylolacrylamide), carboxymethyl cellulose, gelatin, polyvinyl alcohol and modified polyvinyl alcohol; gelatin, polyvinyl alcohol and modified polyvinyl alcohol are more preferable; and polyvinyl alcohol and modified polyvinyl alcohol are specially preferable.

(8) Applications of Films

One embodiment of the film of the invention is a film of the cured liquid crystal alignment (for example, horizontal alignment, vertical alignment, hybrid alignment) of the polymerizable liquid crystal composition, exhibiting optical anisotropy. The film may be used as an optical compensation film for liquid crystal displaying devices.

Another embodiment of the film of the invention is a film of the cured cholesteric liquid crystal phase of the polymerizable liquid crystal composition, exhibiting selective reflection at the wavelength range. The film exhibiting selective reflection at the IR wavelength region (800-1300 nm) may be attached to window plates of buildings or vehicles or may be incorporated into laminated glasses, which may be used as a heat-shielding member.

3. Polymer

The present invention relates to polymers prepared by carrying out polymerization of one or two or more polymerizable liquid crystal compounds represented by formula (I), to polymers prepared by carrying out polymerization of the polymerizable liquid crystal composition of the invention. The polymers may exhibit liquid-crystallinity or non-liquid-crystallinity. The polymers have the repeating unit derived from the polymerizable liquid crystal compound represented by formula (I), may exhibit high $\Delta n$, and may be useful as a material of various optical elements.

EXAMPLES

Paragraphs below will further specifically describe features of the present invention, referring to Examples and Comparative Examples. Any materials, amount of use, ratio, details of processing, procedures of processing and so forth shown in Examples may appropriately be modified without departing from the spirit of the present invention. Therefore, it is to be understood that the scope of the present invention should not be interpreted in a limited manner based on the specific examples shown below.

Example 1

Synthetic Example of Compound G-4

Compound G-4 was prepared according to the following scheme.

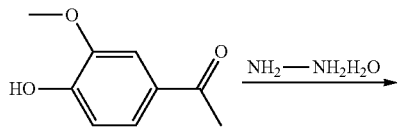

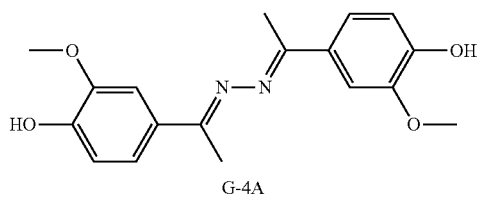
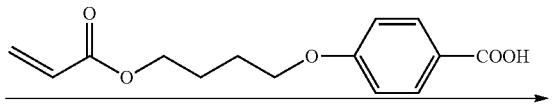
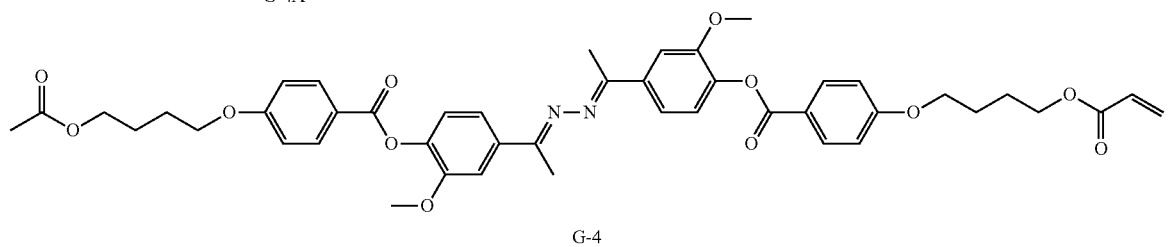

Synthesis of Compound G-4A

Hydrazine monohydrate (1.4 mL) was added to a methanol solution (50 mL) of 4-hydroxy-3-methoxy acetophenone (10 g), and after adding with acetic acid (0.2 mL) as a catalyst, was refluxed under heat for three hours. The reaction liquid was cooled to a room temperature, and then the generated crystals were filtered to give 7.5 g of Compound G-4A (yield 82%). The determination of the obtained compound was performed by measurement of $^1$H-NMR spectra.

$^1$H-NMR (400 MHz, CDCl$_3$): δ 2.3 (s, 6H), δ 4.0 (s, 6H), δ 5.8 (s, 2H), δ 6.95 (d, 2H), δ 7.3 (d, 2H), δ 7.65 (s, 2H).

Synthesis of Compound G-4

4-(4-acryloyloxybutyloxy)benzoic acid was prepared according to the process described in Japanese Patent No. 4397550, p. 18, [0085]-[0087].

A tetrahydrofuran solution (10 mL) of 4-(4-acryloyloxybutyloxy)benzoic acid (2.7 g) and di-isopropyl ethylamine (2.0 mL) was added dropwise to a tetrahydrofuran solution (10 mL) of methane sulfonyl chloride (0.59 mL) while the inner temperature was kept at a temperature of equal to or lower than −5 degrees Celsius. The mixed solution was stirred for an hour at the same temperature, added with G-4A (1.67 g), and then added dropwise with di-isopropyl ethylamine (2.0 mL) while the inner temperature was kept at a temperature of equal to or lower than 0 degree Celsius. After the dropwise addition, p-methoxy phenol (0.1 g) was added to the mixture, and was stirred for three hours at a room temperature. The reaction liquid was added with methanol (100 mL), and the generated crystals were filtered. The obtained crystals were added with methanol (10 mL) and p-methoxy phenol (0.05 g), refluxed under heat for 30 minutes, and cooled to a room temperature. The crystals were filtered to give 3.0 g of Compound G-6 (yield 71%). The determination of the obtained compound was performed by measurement of $^1$H-NMR.

$^1$H-NMR (400 MHz, CDCl$_3$): δ1.9-2.0 (m, 8H), δ2.3 (s, 6H), δ3.9 (s, 6H), δ4.1-4.15 (m, 4H), δ4.25-4.3 (m, 4H), δ5.85 (d, 2H), δ6.15 (dd, 2H), δ6.4 (d, 2H), δ7.0 (d, 4H), δ7.2 (d, 2H), δ7.4 (d, 2H), δ7.7 (s, 2H), 8.2 (d, 4H).

Example 2

Synthetic Example of Compound G-1

Compound G-1 was prepared according to the following scheme.

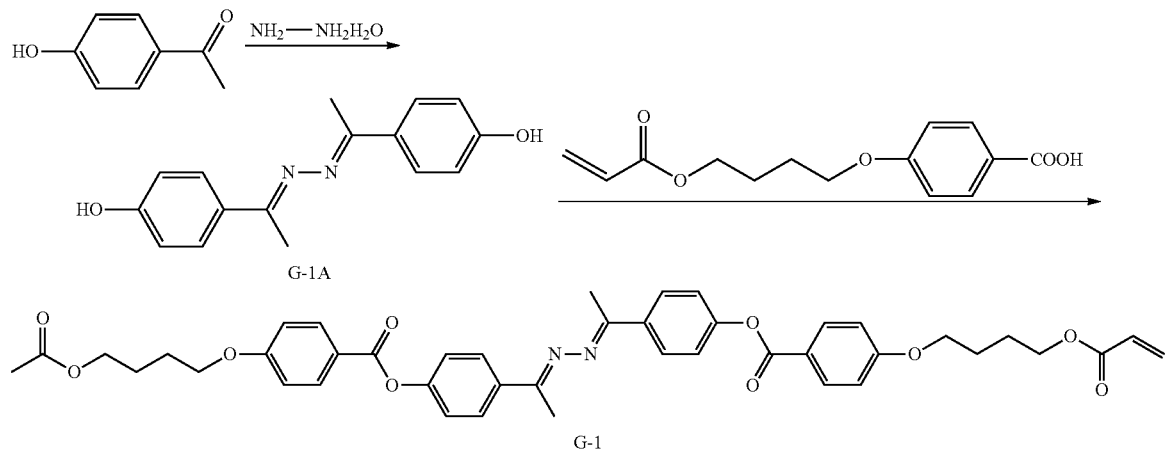

Synthesis of Compound G-1A

Compound G-1A (yield 80%) was prepared in the same manner as In the process of preparing Compound G-4A, except that an equivalent mole of 4-hydroxy-acetophenone was used in place of 4-hydroxy-3-methoxy-acetophenone. The determination of the obtained compound was performed by measurement of $^1$H-NMR.

$^1$H-NMR (400 MHz, DMSO-d6): δ2.25 (s, 6H), δ6.95 (d, 4H), δ7.8 (d, 4H), δ9.85 (bd, 2H).

Synthesis of Compound G-1

Compound G-1 (yield 68%) was prepared in the same manner as the process of preparing Compound G-4, except that an equivalent mole of G-1A was used in place of a material, G-4A. The determination of the obtained compound was performed by measurement of $^1$H-NMR.

$^1$H-NMR (400 MHz, CDCl$_3$): δ1.9-2.0 (m, 8H), δ2.35 (s, 6H), δ4.1-4.15 (m, 4H), δ4.25-4.3 (m, 4H), δ5.85 (d, 2H), δ6.15 (dd, 2H), δ6.4 (d, 2H), δ7.0 (d, 4H), δ7.3 (d, 2H), δ8.0 (d, 4H), 8.2 (d, 4H).

Example 3

Synthetic Example of Compound G-2

Compound G-2 was prepared according to the following scheme.

Synthesis of Compound G-2A

Compound G-2A (yield 87%) was prepared in the same manner as the process of preparing Compound G-4A, except that an equivalent mole of 4-hydroxy propiophenone was used in place of 4-hydroxy-3-methoxy-acetophenone. The determination of the obtained compound was performed by measurement of $^1$H-NMR.

$^1$H-NMR (400 MHz, DMSO-d6): δ1.0 (t, 6H), δ2.8 (q, 4H), δ6.85 (d, 4H), δ7.8 (d, 4H), δ9.85 (bd, 2H).

Synthesis of G-2

Compound G-2 (yield 64%) was prepared in the same manner as the process of preparing Compound G-4, except that an equivalent mole of G-2A was used in place of a material, G-4A. The determination of the obtained compound was performed by measurement of $^1$H-NMR.

$^1$H-NMR (400 MHz, CDCl$_3$): δ1.15 (t, 6H) δ1.9-2.0 (m, 8H), δ2.95 (q, 4H), δ4.1-4.15 (m, 4H), δ4.3-4.35 (m, 4H), δ5.85 (d, 2H), δ6.15 (dd, 2H), δ6.4 (d, 2H), δ7.0 (d, 4H), δ7.3 (d, 2H), δ8.0 (d, 4H), 8.2 (d, 4H).

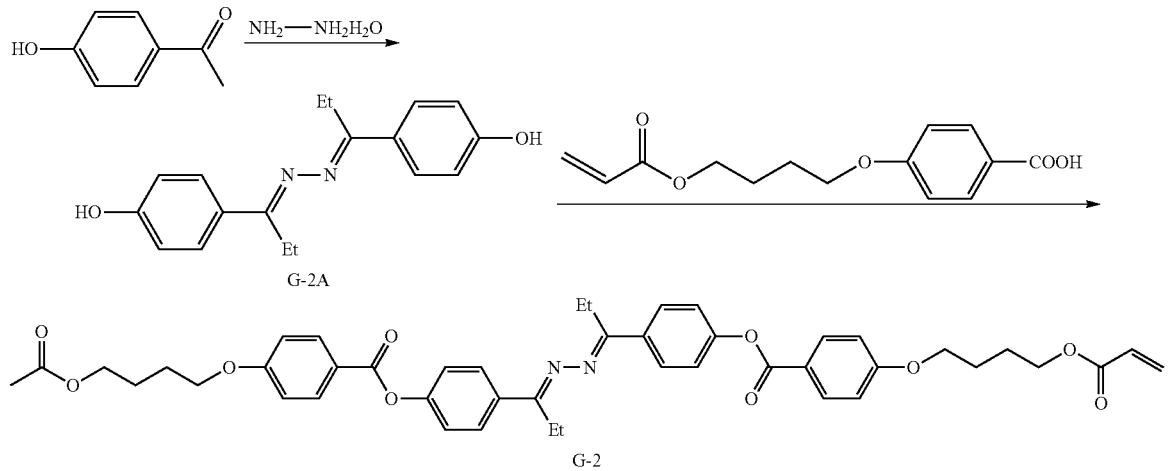

Example 4

Synthetic Example of Compound G-7

Compound G-7 was prepared according to the following scheme.

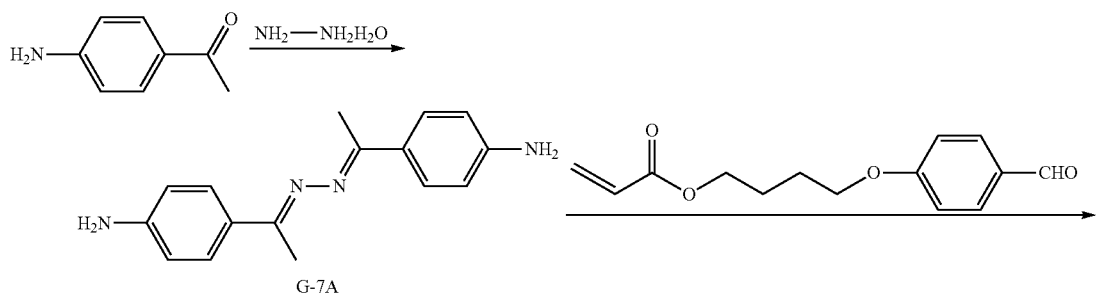

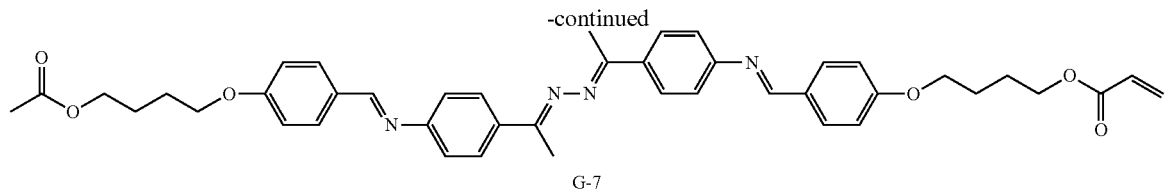

G-7

Synthesis of G-7A

Compound G-7A (yield 93%) was prepared in the same manner as In the process of preparing Compound G-4A, except that an equivalent mole of 4-aminoacetophenone was used in place of 4-hydroxy-3-methoxy-acetophenone. The determination of the obtained compound was performed by measurement of $^1$H-NMR.

$^1$H-NMR (400 MHz, DMSO-d6): δ2.25 (s, 6H), δ4.2 (bd, 4H), δ6.65 (d, 4H), δ7.8 (d, 4H).

Synthesis of Compound G-7

4-(4-acryloyloxybutyloxy)benzaldehyde was prepared according to the process described in Japanese Patent No. 4397550, p. 18, [0085]-[0087].

4-(4-acryloyloxybutyloxy)benzaldehyde (5.0 g), G-7A (2.6 g), and p-methoxy phenol (0.1 g) were mixed in methanol (50 mL), and refluxed under heat for 4 hours. The reaction solution was cooled to a room temperature, and the generated crystals were filtered. The obtained crystals were added with ethyl acetate (10 mL), methanol (20 mL), and p-methoxy phenol (0.05 g), refluxed under heat for 30 minutes, and cooled to a room temperature. The crystals were filtered to give 4.5 g of Compound G-7 (yield 64%). The determination of the obtained compound was performed by measurement of $^1$H-NMR.

$^1$H-NMR (400 MHz, CDCl$_3$): δ1.9-2.0 (m, 8H), δ2.25 (s, 6H), δ4.1-4.15 (m, 4H), δ4.25-4.3 (m, 4H), δ5.85 (d, 2H), δ6.15 (dd, 2H), δ6.4 (d, 2H), δ7.0 (d, 4H), δ7.3 (d, 2H), δ7.85 (d, 4H), 8.0 (d, 4H), 8.6 (s, 2H).

Example 5

Synthetic Example of Compound G-12

Compound G-12 was prepared according to the following scheme.

Synthesis of Compound G-12

4-acryloyloxybutyl methane sulfonate was prepared by referring to the method described in Japanese Patent No. 4397550, p. 18, [0085]-[0087].

G-2A (2.8 g), potassium carbonate (4.0 g), and p-methoxy phenol (0.1 g) were mixed in dimethylacetamide (50 mL), and added dropwise with 4-acryloyloxybutyl methane sulfonate (4.4 g) under stirring hardly, and reacted at an inner temperature of 75 degrees Celsius for 4 hours. The reaction solution was cooled to a room temperature, and added with ethyl acetate (50 mL) and water (50 mL). The extracted organic layer was washed with water (20 mL) twice, dried by magnesium sulfate, and added with p-methoxy phenol (0.05 g); and then the solvent was removed therefrom by distillation under a reduced pressure. The concentrated product was added with ethyl acetate (20 mL) and methanol (60 mL), refluxed under heat for 30 minutes, and then cooled to a room temperature. The obtained crystals were filtered to give 2.1 g of Compound G-12 (yield 83%). The determination of the obtained compound was performed by measurement of $^1$H-NMR.

$^1$H-NMR (400 MHz, CDCl$_3$): δ1.15 (t, 6H) δ1.9-2.0 (m, 8H), δ2.9 (q, 4H), δ4.0-4.1 (m, 4H), δ4.2-4.3 (m, 4H), δ5.85 (d, 2H), δ6.15 (dd, 2H), δ6.4 (d, 2H), δ6.95 (d, 4H), 7.85 (d, 4H).

Example 5

Preparation of Retardation Film

A liquid crystal composition having the following formulation was prepared by using Compound G-1, which was prepared in the above-described example. This was used as Coating Liquid (1).

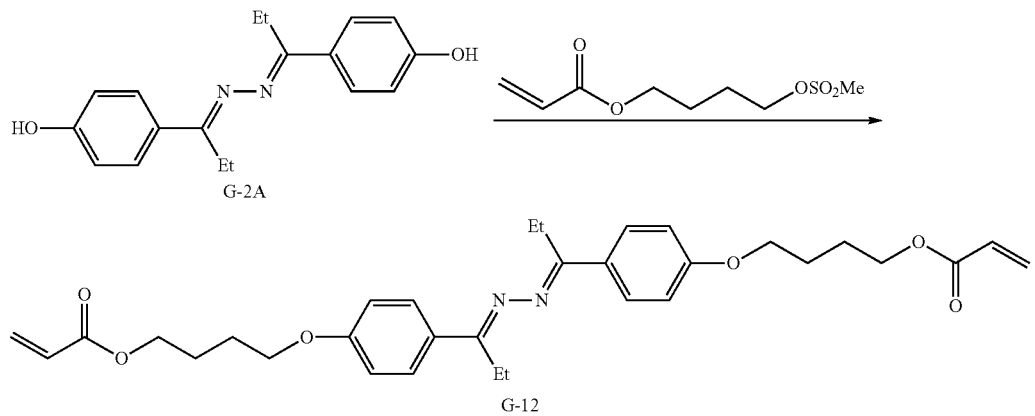

| | |
|---|---:|
| Compound (G-1) | 33 parts by mass |
| Polymerizable liquid crystal compound (M-1) | 67 parts by mass |
| Agent for controlling alignment at an air-interface (1) | 0.1 part by mass |
| Polymerization initiator IRGACURE819 (Ciba-Japan) | 3 parts by mass |
| Solvent chloroform | 800 parts by mass |

Polymerizable liquid crystal compound (M-1)

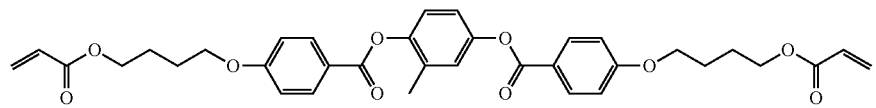

Agent for controlling alignment at an air-interface (1)

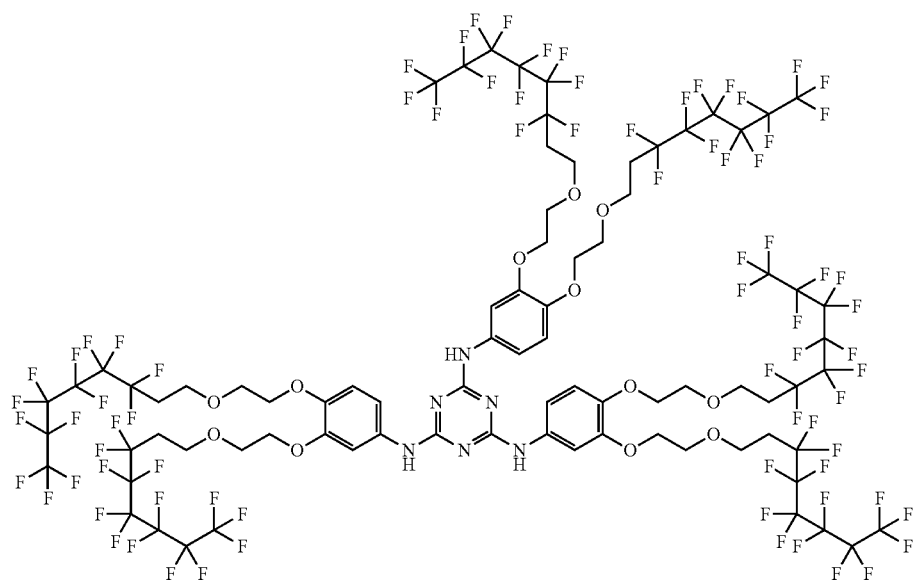

A glass substrate was washed and dried, a commercially-available polyimide alignment film (SE-130, from Nissan Chemical Industries, Ltd.) was formed according to a coating method using a wire bar, the coated film was heated at 250 degrees Celsius for one hour, allowed to cool, and rubbed at room temperature. Coating liquid (1) was applied to the surface of the alignment film according to a spin coating method at a room temperature. The coated film was heated at 120 degrees Celsius for 30 minutes for maturation, and then irradiated with UV light under an atmosphere of nitrogen gas at a room temperature for 10 seconds by a high-pressure mercury lamp without shorter wavelength components, thereby to fix the alignment and form a retardation film, Retardation film 1. During the period from the step of applying the coating liquid to the step of heating it, any precipitated crystals were not found.

Retardation film 1 was observed under a polarizing microscope, and the monoaxial alignment without any alignment defect was found in the film. The haze value of the film was measured by using a Haze meter "NHD2000" (NIPPON DENSHOKU INDUSTRIES CO., LTD.), and it was found that the haze value of the film was 0.09. The film was measured in a Tip-Tilt mode by using AxoScan manufactured by AXOMETRIX. The averaged tilt angle calculated by AxoScan was 1 degree, and it was confirmed that an A-plate type retardation film was obtained. The value of Δn at a wavelength of 550 nm was 0.199, which was calculated on the basis of retardation, measured by AxoScan, and the thickness of the retardation film, measured by a confocal scanning laser thickness-measuring equipment, "FV-750", manufactured by KEYENCE.

Furthermore, Retardation film 1 was irradiated with light through an interference filter "WG320" (Shimadzu Corporation) for 150 hours by using a Xenon-decoloration testing device (EAGLE ENGINEERING). The absorption spectra of the film were measured by using a spectral photometer "UV-3100PC" (Shimadzu Corporation); and the data measured before and after the irradiation of light were compared to each other. It was confirmed that the transmission properties at the wavelength range of from 350 to 800 nm were not changed.

Examples 6-8

Each of Liquid crystal compositions, Coating liquids (2)-(4), was prepared in the same manner as Example 5, except that each of the compounds prepared in the above examples was used in place of Compound G-1. Each of Retardation films 2-4 was prepared in the same manner as Example 5, except that the polymerization temperature was changed to the temperature shown in Table 1 respectively. All of the obtained retardation films showed a good alignment-property, and had a haze value of 0.1 or lower. The Δn values at 550 nm of the retardation films, which were calculated in the same manner as described above, are shown in Table 1.

Comparative Example 1

Formation of Comparative Retardation Film

A liquid crystal composition, having the following formulation, Coating liquid (9), was prepared in the same manner as Example 5.

| Polymerizable liquid crystal compound (M-1) | 100 parts by mass |
| --- | --- |
| Agent for controlling alignment at an air-interface (1) | 0.1 part by mass |
| Polymerization initiator IRGACURE819 (Ciba-Japan) | 3 parts by mass |
| Solvent chloroform | 800 parts by mass |

Retardation film 5 was prepared in the same manner as Example 5, except that Coating liquid (9) was used in place of Coating liquid (1). And the upper limit of the temperature at which the liquid crystal composition of Coating liquid (9) showed the liquid crystal phase was lower than that of Example 1, the maturing temperature was changed to 90 degrees Celsius. During the period from the step of applying the coating liquid to the step of heating it, some precipitated crystals were found. As a result, after maturing the alignment by heating again, unevenness in the thickness remained at the part of precipitation. The haze value of the film was 0.19.

The Δn value at 550 nm of Retardation film 6, which was calculated in the same manner as described above, was 0.170. The film was subjected to the decoloration-evaluation in the same manner as described above, and it was confirmed that the absorption at the wavelength range of from 350 to 800 nm was lowered.

Comparative Example 2

Formation of Comparative Retardation Film

Coating liquid (10) was prepared in the same manner as Example 5, except that Compound M-2 was used in place of Compound G-1. Retardation film 6 was prepared in the same manner as Example 5, except that Coating liquid (10) was used in place of Coating liquid (1). And the upper limit of the temperature at which the liquid crystal composition of Coating liquid (10) showed the liquid crystal phase was lower than that of Example 1, the maturing temperature was changed to 100 degrees Celsius. The Δn value at 550 nm of Retardation film 6, which was calculated in the same manner as described above, was 0.195. The film was subjected to the decoloration-evaluation in the same manner as described above, and it was confirmed that the absorption at the wavelength range of from 350 to 800 nm was lowered.

The results are shown in the following table.

TABLE 1

|  | Compound | Polymerization Temperature | Δn | Haze | Decoloration |
| --- | --- | --- | --- | --- | --- |
| Example 5 | G-1 | 50 degrees Celsius | 0.199 | 0.09 | No variation |
| Example 6 | G-2 | 25 degrees Celsius | 0.202 | 0.07 | No variation |
| Example 7 | G-4 | 25 degrees Celsius | 0.206 | 0.08 | No variation |
| Example 8 | G-7 | 80 degrees Celsius | 0.214 | 0.08 | No variation |
| Comparative Example 1 | M-1 | 25 degrees Celsius | 0.170 | 0.19 | Variation |
| Comparative Example 2 | M-2 | 25 degrees Celsius | 0.195 | 0.11 | Variation |

Example 9

Formation of Selective Reflection Film

A liquid crystal composition having the following formulation was prepared by using Compound G-1, which was prepared in the above-described example. This was used as Coating Liquid (5).

| Compound (G-1) | 50 parts by mass |
| --- | --- |
| Polymerizable liquid crystal compound (M-1) | 50 parts by mass |
| Chiral agent Paliocolor LC756 (BASF) | 3.2 parts by mass |
| Agent for controlling alignment at an air-interface (1) | 0.04 part by mass |
| Polymerization initiator IRGACURE819 (Ciba-Japan) | 3 parts by mass |
| Solvent chloroform | 300 parts by mass |

A substrate having an alignment layer thereon was prepared in the same manner as Example 5, and Coating liquid (5) was applied to the surface of the alignment layer at a room temperature according to a spin-coating method, heated at 120 degrees Celsius for three minutes for maturation, and then irradiated with UV light for 10 seconds at a room temperature by a high-pressure mercury lamp without shorter wavelength components, thereby to fix the alignment and form a selective reflection film, Selective reflection film 1. During the period from the step of applying the coating liquid to the step of heating it, any precipitated crystals were not found.

Selective reflection film 1 was observed under a polarizing microscope, and the uniform alignment without any alignment defect was found in the film. The transmission spectrum Compound M-2

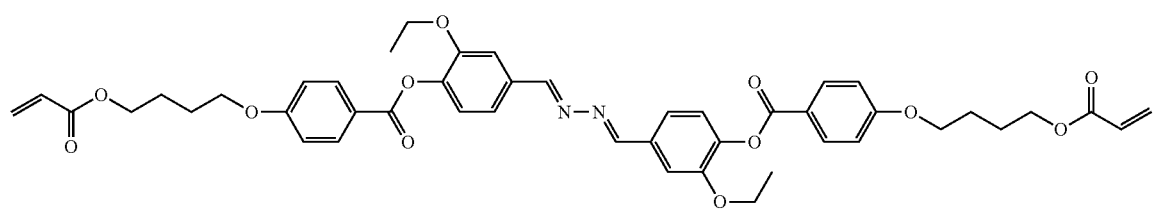

of the film was measured by using spectral photometer "UV-3100PC" (Shimadzu Corporation), and it was found that the film had a peak of selective reflection at 1000 nm of which half bandwidth was 138 nm. The Δn of the film which was calculated on the basis of the half bandwidth of the peak and the helical pitch of the liquid crystal composition was 0.218. The haze value of the film was measured by using a Haze meter "NHD2000" (NIPPON DENSHOKU INDUSTRIES CO., LTD.), and it was found that the haze value of the film was 0.11.

Examples 10-12

Liquid crystal compositions, Coating liquids (6)-(8), were prepared in the same manner as Example 9, except that the compounds prepared in the above examples were respectively used in place of Compound G-1. Selective reflection films 2-4 were respectively prepared in the same manner as Example 9, except that each of Coating liquids (6)-(8) was used in place of Coating liquid (5), and that the polymerization temperature was changed to the temperature described in Table 2. All of the obtained selective reflection films showed a good alignment-property, and had a haze value of 0.15 or lower. The Δn value and the half bandwidth of the peak of each of the films are shown in Table 2.

Comparative Example 3

Formation of Selective Reflection Film

A liquid crystal composition, Coating liquid (11), having the following formulation was prepared in the same manner as Example 9.

| | |
|---|---|
| Polymerizable liquid crystal compound (M-1) | 100 parts by mass |
| Chiral agent Paliocolor LC756 (BASF) | 2.8 parts by mass |
| Agent for controlling alignment at an air-interface (1) | 0.04 part by mass |
| Polymerization Initiator IRGACURE819 (Ciba-Japan) | 3 parts by mass |
| Solvent Chloroform | 300 parts by mass |

Selective reflection film 6 was prepared in the same manner as Example 9, except that Coating liquid (11) was used in place of Coating liquid (5). And the upper limit of the temperature at which the liquid crystal composition of Coating liquid (11) showed the liquid crystal phase was lower than that of Example 9, the maturing temperature was changed to 100 degrees Celsius. During the period from the step of applying the coating liquid to the step of heating it, some precipitated crystals were found. As a result, after maturing the alignment by heating again, unevenness in the thickness remained at the part of precipitation.

The film had a peak of selective reflection at 1000 nm of which half bandwidth was 106 nm. The Δn of the film which was calculated on the basis of the half bandwidth of the peak and the helical pitch of the liquid crystal composition was 0.168. The haze value of the film was measured by using a Haze meter "NHD2000" (NIPPON DENSHOKU INDUSTRIES CO., LTD.), and it was found that the haze value of the film was 0.88.

The results are shown in the following table.

TABLE 2

| | Compound | Polymerization Temperature | Half Bandwidth | Δn | Haze |
|---|---|---|---|---|---|
| Example 9 | G-1 | 50 degrees Celsius | 138 nm | 0.218 | 0.11 |
| Example 10 | G-2 | 25 degrees Celsius | 141 nm | 0.223 | 0.09 |
| Example 11 | G-4 | 25 degrees Celsius | 140 nm | 0.221 | 0.12 |
| Example 12 | G-7 | 80 degrees Celsius | 144 nm | 0.227 | 0.08 |
| Comparative Example 3 | M-1 | 25 degrees Celsius | 106 nm | 0.168 | 0.88 |

Example 13

Relationship Between the Concentration of the Polymerizable Liquid Crystal Compound of the Invention or the Thickness of the Film and the Alignment Property Coating liquids, containing Compound G-2 and Compound M-1 as polymerizable liquid crystal mixed in a different ratio from each other, a polymerization initiator, IRGACURE819 (Ciba-Japan), in 3 parts by mass with respect to the total mass of the polymerizable liquid crystal, and chloroform solvent, were prepared respectively. The retardation films having a thickness of 1.5 micro meters, were prepared respectively by using the coating liquids in the same manner as Example 5, except that the polymerization temperature was changed to 40 degrees Celsius.

The films were observed under a polarizing microscope, and it was confirmed that the monoaxial alignment without any alignment defect was achieved when the coating liquid, containing Compound G-2 in an amount of 10 or more % by mass, was used. On the other hand, it was confirmed that the reverse-tilt domains with some alignment defects were formed when the coating liquid, containing Compound G-2 in an amount of 5 or less % by mass, was used.

Furthermore, the films were measured in a Tip-Tilt mode by using AxoScan manufactured by AXOMETRIX. The averaged tilt angles (β) calculated by AxoScan were plotted against an amount (% by mass) of Compound G-2, which is shown in FIG. 1. From the results shown in FIG. 1, it is understandable that, in the concentration range exhibiting a good alignment-property, the averaged tilt angle becomes smaller. Namely, one feature of the compound of the invention resides in that adding the compound in an amount of 10 or more % by mass contributes to decreasing the tilt angle of the liquid crystal composition as a whole and to improving the alignment-property without using any agent for controlling the alignment at air-interface. And the compound of the invention is very useful also in terms of this feature.

Figure 2:
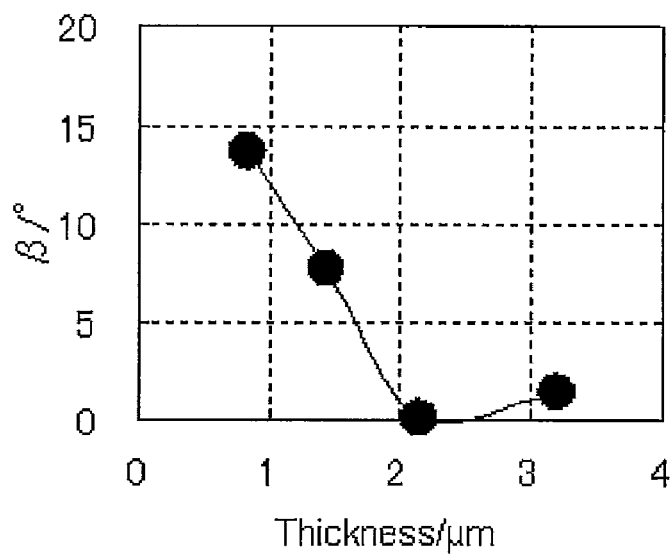
FIG. 2 is a graph showing a relationship between the thickness of the retardation film prepared in Example and the tilt angle (β) of liquid crystal molecules in the retardation film prepared in Example.

Retardation films having a different thickness from each other were prepared by using the coating liquid containing Compound G-2 in an amount of 5% under the condition (the polymerization temperature was 80 degrees Celsius); and the averaged tilt angle (β) of each of the films was measured, and was plotted against thickness of each of the films, which is shown in FIG. 2. From the results shown in FIG. 2, it is understandable that adding the compound contributes to decreasing the tilt angle of the liquid crystal composition as a whole and to improving the alignment-property without using any agent for controlling the alignment at air-interface by increasing the thickness of the film, even if using the coating liquid containing Compound G-2 in an amount of 5% by mass On the basis of the obtained results, the composition, having the formulation same as that of Example 10 except that the agent for controlling alignment at an air-interface (1) was not added, was prepared; and a selective reflection film was prepared in the same manner as Example 10 by using the composition. As well as Example 10, the selective reflection film without any alignment defect was obtained. On the other hand, the composition, having the formulation same as that of Comparative Example 3 not containing Compound G-2 at all, was prepared; and a selective reflection film was prepared in the same manner as Example 10 by using the composition. A lot of alignment defects, caused by the inclination or deformation of the helical axis, were found in the selective reflection film, and the remarkably-unevenness selective reflection film was obtained.

On the other hand, a retardation film was prepared in the same manner as Example 13, except that a coating liquid, containing 20% by mass of Compound M-2 in place of Compound G-2, was used; and the averaged tilt angle β of the film was measured. The averaged tilt angle was 13.5 degrees. Therefore, the effect of improving the alignment property was not confirmed unlike the example employing Compound G-2 of the invention.

What is claimed is:

1. A polymerizable liquid crystal compound represented by formula (I):

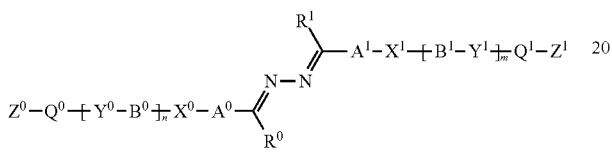

(I)

where $R^0$ and $R^1$ each independently represent a hydrogen atom, or a $C_{1-4}$ alkyl group which may have at least one substituent, provided that at least one of $R^0$ and $R^1$ represent a $C_{1-4}$ alkyl group which may have at least one substituent; $A^0$, A1, $B^0$ and $B^1$ each independently represent a single bond, or a divalent linking group having a cyclic structure which may have at least one substituent; $X^0$, $X^1$, $Y^0$ and $Y^1$ each independently represent a single bond, —O—, —S—, —OCO—, —COO—, —OCOO—, —NR$^2$CO—, —CONR$^2$—, —OCONR$^2$—, —NR$^2$COO—, —NR$^2$CONR$^2$—, —C=N— or —N=C— where $R^2$ represents a hydrogen atom or $C_{1-3}$ alkyl group which may have at least one substituent; $Q^0$ and $Q^1$ each independently represent a single bond or a $C_{1-20}$ divalent aliphatic group which may have at least one substituent, provided that one —CH$_2$— or two or more —CH$_2$—, which may be not adjacent to each other, may be replaced with —O—, —S—, —NR$^3$—, —OCO—, —COO—, —OCOO—, —NR$^3$CO—, or —CONR$^3$—; $R^3$ represents a hydrogen atom or $C_{1-3}$ alkyl group; $Z^0$ and $Z^1$ each independently represent a hydrogen atom, cyano, halogen atom or polymerizable group; and n and m each independently represent an integer of from 0 to 2.

2. The polymerizable liquid crystal compound of claim 1, wherein $A^0$ and $A^1$ each independently represent a divalent aromatic group which may have at least one substituent.

3. The polymerizable liquid crystal compound of claim 1, wherein $B^0$ and $B^1$ each independently represent a divalent aromatic group which may have at least one substituent.

4. The polymerizable liquid crystal compound of claim 1, wherein $R^0$ and $R^1$ each independently represent a $C_{1-4}$ alkyl group.

5. The polymerizable liquid crystal compound of claim 1, wherein n and m are 1.

6. The polymerizable liquid crystal compound of claim 1, wherein at least one of $Z^0$ and $Z^1$ represents a polymerizable group selected from Group (II) shown below:

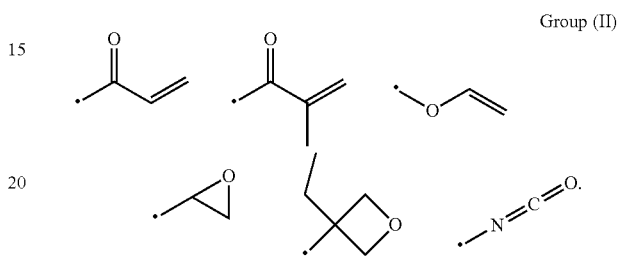

Group (II)

7. The polymerizable liquid crystal compound of claim 6, wherein $Z^0$ and $Z^1$ each independently represent a polymerizable group selected from Group (II).

8. The polymerizable liquid crystal compound of claim 1, wherein $Z^0$ and $Z^1$ each independently represent a (meth) acrylate group.

9. The polymerizable liquid crystal compound of claim 1, wherein $Y^0$ and $Y^1$ represent —O—.

10. A polymerizable liquid crystal composition comprising at least one polymerizable liquid crystal compound of claim 1.

11. The polymerizable liquid crystal composition of claim 10, comprising at least one chiral compound.

12. A polymer prepared by polymerizing a polymerizable liquid crystal compound of claim 1.

13. A polymer prepared by polymerizing a polymerizable liquid crystal composition of claim 10.

14. A film formed by curing a polymerizable liquid crystal composition of claim 10.

15. A film formed by curing a cholesteric liquid crystal phase of a polymerizable liquid crystal composition of claim 11.

16. The film of claim 14, having optical anisotropy.

17. The film of claim 14, having selective reflection.

18. The film of claim 17, having selective reflection in the infrared region.

* * * * *